United States Patent
Irie et al.

(10) Patent No.: US 9,224,051 B2
(45) Date of Patent: Dec. 29, 2015

(54) LENS-ATTACHED MATTER DETECTOR FOR DETERMINING PRESENCE OR ABSENCE OF ATTACHED MATTER, LENS-ATTACHED MATTER DETECTION METHOD EXECUTED BY THE SAME, AND VEHICLE SYSTEM HAVING THE SAME

(71) Applicant: CLARION CO., LTD., Saitama (JP)

(72) Inventors: Kota Irie, Saitama (JP); Shoji Muramatsu, Tokyo (JP); Kenji Kato, Yokohama (JP); Masahiro Kiyohara, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 258 days.

(21) Appl. No.: 13/932,787

(22) Filed: Jul. 1, 2013

(65) Prior Publication Data

US 2014/0010408 A1 Jan. 9, 2014

(30) Foreign Application Priority Data

Jul. 3, 2012 (JP) ................................. 2012-149537
Jun. 26, 2013 (JP) ................................. 2013-133576

(51) Int. Cl.
G06K 9/00 (2006.01)
G06T 7/00 (2006.01)

(52) U.S. Cl.
CPC .......... *G06K 9/00791* (2013.01); *G06T 7/0002* (2013.01); *G06T 2207/20021* (2013.01); *G06T 2207/30252* (2013.01)

(58) Field of Classification Search
CPC G06K 9/00791; G06T 7/0002; G06T 7/0085; G06T 2207/20021; G06T 2207/30252; H04N 5/2351; G01M 11/02; G01M 11/0257; G01M 11/0278; G01N 21/88; G01N 21/8803; G01N 21/8851; G01N 2021/8887
See application file for complete search history.

(56) References Cited

U.S. PATENT DOCUMENTS

| | | | |
|---|---|---|---|
| 2004/0037457 A1 * | 2/2004 | Wengender et al. | 382/141 |
| 2006/0115121 A1 | 6/2006 | Saka et al. | |
| 2007/0115357 A1 | 5/2007 | Stein et al. | |
| 2008/0246860 A1 * | 10/2008 | Kusama | 348/241 |

FOREIGN PATENT DOCUMENTS

| | | |
|---|---|---|
| DE | 103 22 087 A1 | 12/2004 |
| JP | 2003-259358 A | 9/2003 |
| WO | 2010038223 A1 | 4/2010 |

OTHER PUBLICATIONS

The extended European search report issued on Oct. 1, 2013, which corresponds to EP13174747.9 and is related to U.S. Appl. No. 13/932,787.

* cited by examiner

*Primary Examiner* — Andrew W Johns

(74) *Attorney, Agent, or Firm* — Studebaker & Brackett PC

(57) ABSTRACT

A lens-attached matter detector includes an edge extractor configured to create an edge image based on an input image, divide the edge image into a plurality of areas including a plurality of pixels, and extract an area whose edge intensity is a threshold range as an attention area, a brightness distribution extractor configured to obtain a brightness value of the attention area and a brightness value of a circumference area, a brightness change extractor configured to obtain the brightness value of the attention area and the brightness value of the circumference area for a predetermined time interval, and obtain a time series variation in the brightness value of the attention area based on the brightness value of the attention area, and an attached matter determiner configured to determine the presence or absence of attached matter based on the time series variation in the brightness value of the attention area.

13 Claims, 18 Drawing Sheets

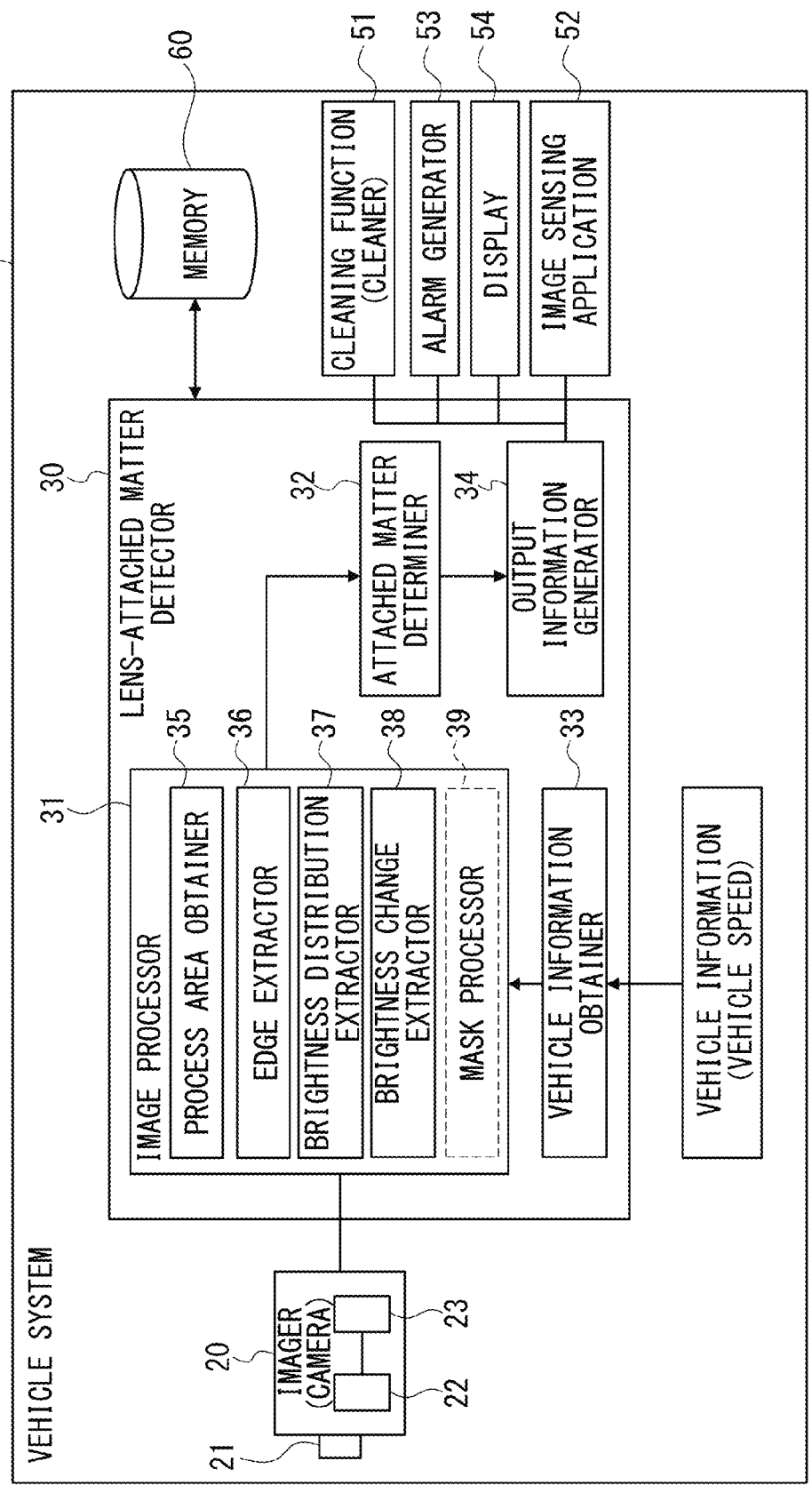

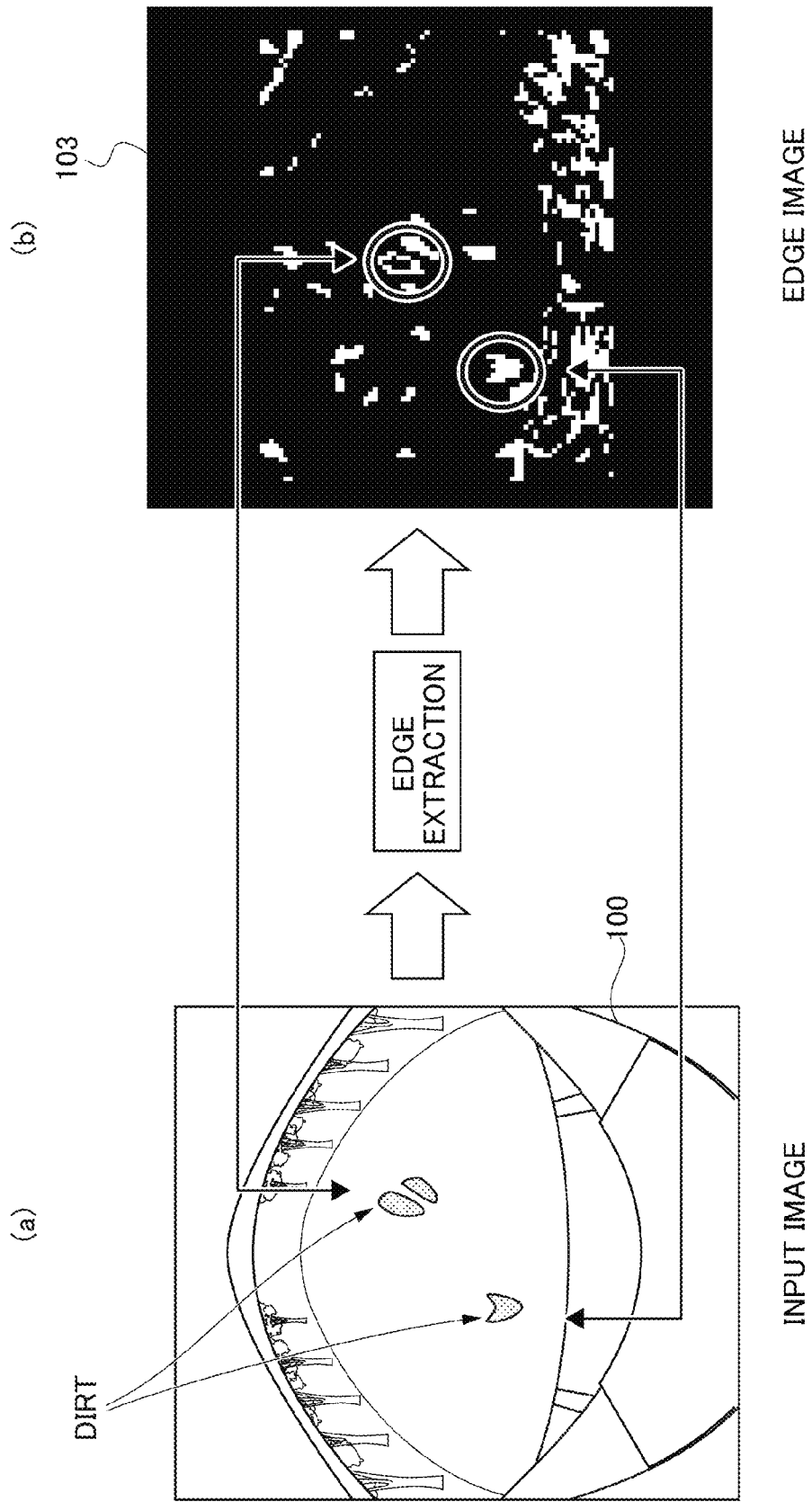

▒ PROCESS TARGET BLOCK
▨ ATTENTION BLOCK
☐ CIRCUMFERENCE BLOCK

| 0 | 0 | 0 | -2 | 0 |
|---|---|---|----|---|
| 0 | 0 | 0 | -4 | -2 |
| 0 | 0 | 0 | 0 | 0 |
| 2 | 4 | 0 | 0 | 0 |
| 0 | 2 | 0 | 0 | 0 |

EDGE FILTER FOR LEFT AREA

| 0 | -2 | 0 | 0 | 0 |
|---|----|---|---|---|
| -2 | -4 | 0 | 0 | 0 |
| 0 | 0 | 0 | 0 | 0 |
| 0 | 0 | 0 | 4 | 2 |
| 0 | 0 | 0 | 2 | 0 |

EDGE FILTER FOR RIGHT AREA

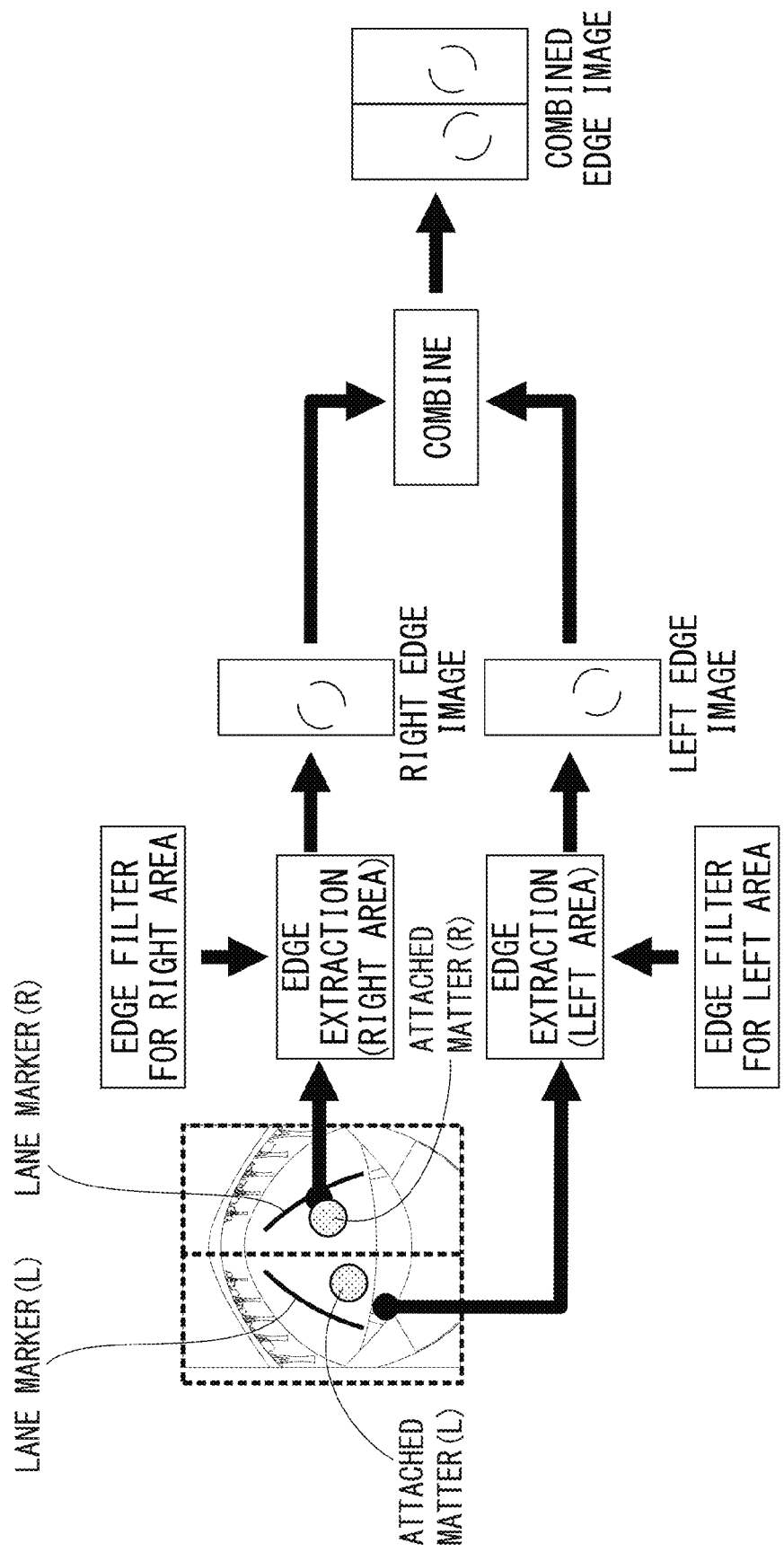

OUTPUT IMAGE

VANISHING POINT
TRACK DETECTION

INPUT IMAGE

OUTPUT IMAGE

INPUT IMAGE

LENS-ATTACHED MATTER DETECTOR FOR DETERMINING PRESENCE OR ABSENCE OF ATTACHED MATTER, LENS-ATTACHED MATTER DETECTION METHOD EXECUTED BY THE SAME, AND VEHICLE SYSTEM HAVING THE SAME

PRIORITY CLAIM

The present application is based on and claims priority from Japanese Patent Application No. 2012-149537, filed on Jul. 3, 2012, and Japanese Patent Application No. 2013-133576, filed on Jun. 26, 2013, the disclosures of which are hereby incorporated by reference in their entirety.

BACKGROUND

1. Field of the Invention

The present invention relates to a lens-attached matter detector which detects attached matter on a lens of a camera, for example, a lens-attached matter detection method, and a vehicle system including the lens-attached matter detector.

2. Description of the Related Art

A system is known which detects a vehicle or a pedestrian existing in a blind area behind a vehicle by an in-vehicle camera when changing a lane, so as to draw a driver's attention by an alarm or an indication light. A system is also known which detects a white line on a road by a camera, so as to draw a driver's attention by an alarm or an indication light when a driver drifts from a lane. Further, a system which sounds a red alert by detecting a vehicle getting closer from behind and a system which assists parking by detecting a parking frame are also known. Hereinafter, an in-vehicle system using an image recognition technique is referred to as an image-sensing application.

A camera for use in such a system may be provided outside a vehicle, and is used while the vehicle is running. For this reason, a stain such as splash of dirt attaches onto a lens surface. When such a stain is prominent, the detection accuracy of a subject by a camera is deteriorated. For this reason, the performance of an image-sensing application such as a system which detects a vehicle or a pedestrian, or a system which detects a white line may be affected. Thus, when a driver is aware of a stain, such a stain is eliminated from a lens by spraying air or cleaning liquid.

However, a driver is sometimes not aware of a stain. For this reason, a stain detector, which automatically detects a stain on a lens, so as to encourage cleaning by informing a driver of the generation of the stain or automatically clean the stain, has been developed (refer to, for example, JP 2003-259358A). In the stain detector described in JP 2003-259358A, a concentration value is obtained for each of two images shot by a camera in different timings, and a difference of these values is extracted to be integrated, so as to obtain an integrated image. In such an integrated image, an area having a predetermined concentration value or below, namely, an area without having a change over time is determined as an area to which a stain is attached. When this stain-attached area is an area for use in an image process by a camera, it is determined that a lens is stained, and a stain-attached signal is sent to a driver or a cleaner.

However, in the stain detector described in JP 2003-259358A, a landscape or an object to be shot (for example, long guide rail, parapet, or side walk) having less change over time has an increased concentration value of an integrated image with a difference, causing false-determination as a stain. Therefore, the development of a highly accurate technique which can detect only attached matter on a lens such as a stain is requested.

SUMMARY

The present invention has been made in view of the above circumferences, and an object of the present invention is to provide a lens-attached matter detector, lens-attached matter detection method capable of detecting only lens-attached matter such as dirt, dust or waterdrops with a high accuracy, and a vehicle system having the lens-attached matter detector.

To attain the above object, one embodiment of the present invention provides a lens-attached matter detector, including: an edge extractor configured to create an edge image based on an input image from an imager having a lens, divide the edge image into a plurality of areas including a plurality of pixels, and extract an area whose edge intensity is a threshold range as an attention area; a brightness distribution extractor configured to obtain a brightness value of the attention area and a brightness value of a circumference area; a brightness change extractor configured to obtain the brightness value of the attention area and the brightness value of the circumference area obtained by the brightness distribution extractor for a predetermined time interval, and obtain a time series variation in the brightness value of the attention area based on the brightness value of the attention area for the predetermined time interval; and an attached matter determiner configured to determine the presence or absence of attached matter based on the time series variation in the brightness value of the attention area.

Moreover, one embodiment of the present invention provides a lens-attached matter detection method which is executed by the above lens-attached matter detector, including an edge extraction process of creating an edge image based on an input image, dividing the edge image into a plurality of areas including a plurality of pixels, and extracting an area whose edge intensity is a threshold range as an attention area; a brightness value distribution extraction process of obtaining a brightness value of the attention area and a brightness value of a circumference area of the attention area; a brightness value extraction process of obtaining the brightness value of the attention area and the brightness value of the circumference area obtained by the brightness value distribution extraction process for a predetermined time interval, and obtaining a time series variation in the brightness value of the attention area based on the brightness value of the attention area for the predetermined time interval; and an attached matter determination process of determining the presence or absence of attached matter based on the time series variation in the brightness value of the attention area.

Furthermore, one embodiment of the present invention provides a vehicle system, including the above lens-attached matter detector; an imager provided in a vehicle, having a lens, and configured to image a circumference of the vehicle; and at least one application configured to operate based on detection information of the lens-attached matter detected by the lens-attached matter detector relative to the input image shot by the imager.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 2 is a block diagram illustrating the configuration of the vehicle system including the lens-attached matter detector according to the first and second embodiments of the present invention.

FIG. 3A illustrates areas for use in vehicle detection and lane detection in an input image, and FIG. 3B illustrates blocked areas including these areas.

FIG. 4 is a view describing a relationship between an input image (a) input to an edge extractor and an edge image (b) output from the edge extractor.

FIG. 6A illustrates an attention block and its circumference blocks, and FIG. 6B illustrates circumference blocks which are targets for the counting step in the second embodiment.

FIG. 9A illustrates a schematic view of an edge filter for a left area, FIG. 9B illustrates a schematic view of an edge filter for a right area, and FIG. 9C illustrates an image of a lane by real view.

FIG. 10 is a view describing a mask process for a lane, and illustrating a step of generating an edge image by applying a filter in each of the right and left areas.

FIG. 12A illustrates an input image having a west sun, and FIG. 12B illustrates a light source mask image generated by the mask processor.

DESCRIPTION OF THE PREFERRED EMBODIMENTS

Hereinafter, an embodiment of a vehicle system including a lens-attached matter detector according to the present invention will be described with reference to the drawings.

First Embodiment

Figure 1:
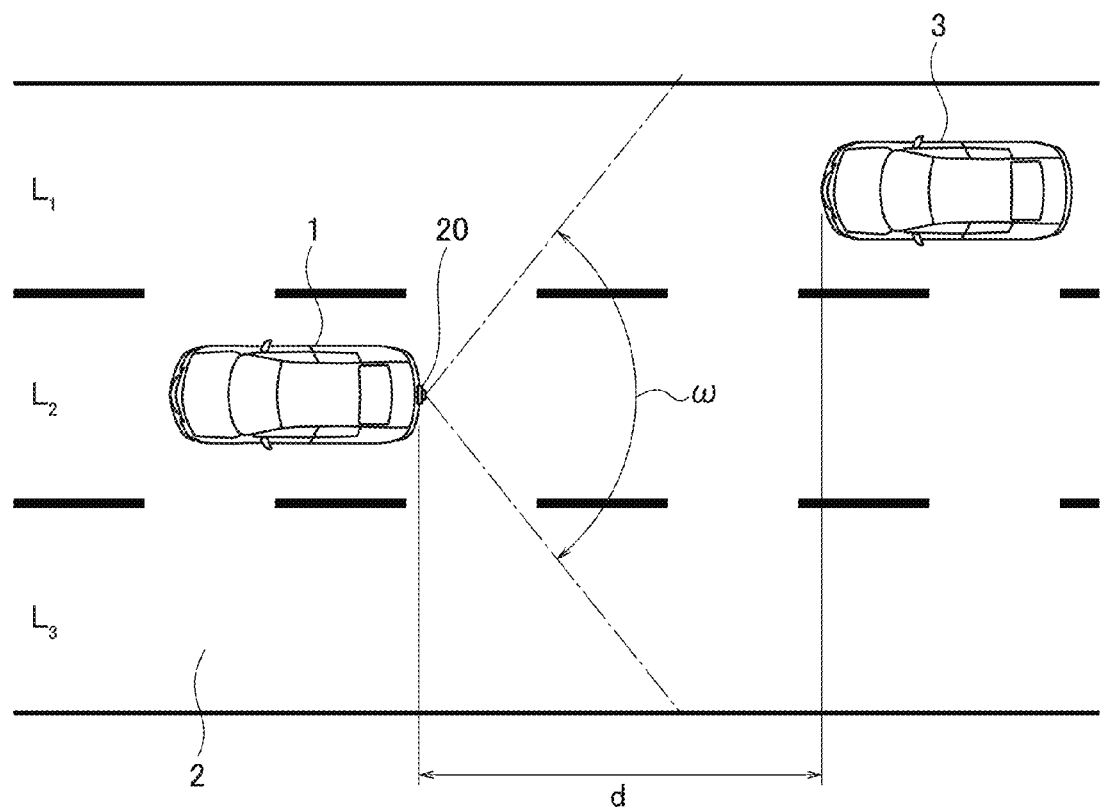
FIG. 1 is a schematic view illustrating a vehicle equipped with a vehicle system including a lens-attached matter detector according to first and second embodiments of the present invention.

FIG. 1 is a view illustrating a running vehicle 1 equipped with a vehicle system including a lens-attached matter detector according to the first embodiment. A camera 20 is provided in the back of the vehicle 1. The camera 20 has a shooting angle of view to which can shoot back over a wide range, so that the camera 20 can shoot a blind area of a driver. A vehicle detection application or the like is performed by using the camera 20. When the vehicle 1 runs in a traffic lane $L_2$ of a three-lane road 2 having lanes $L_1$-$L_3$, and changes a traffic lane from the traffic lane $L_2$ to the traffic lane $L_1$, another vehicle 3 in the blind area in the back of the vehicle 1 is detected. The vehicle detection application which detects another vehicle 3 starts to beep or calls attention to a driver by lighting an indication light.

In this embodiment, the lens-attached matter detector is used for the camera 20 provided in the back of the vehicle 1, but the present invention is not limited thereto. When a camera is provided in the front or the side of a vehicle, any lens-attached matter of these cameras can be detected. The lens-attached matter detector can be configured to inform which lens has attached matter.

A vehicle system 10 according to the first embodiment will be described with reference to FIG. 2. The vehicle system 10 according to the first embodiment is installed in the vehicle 1, and includes the camera (imager) 20 which images an image at the back of the own vehicle 1, a lens-attached matter detector 30 which detects lens-attached matter, a cleaning function (cleaner) 51 which automatically cleans based on the result detected by the lens-attached matter detector 30, an alarm generator 53 which informs a driver of lens-attached matter by alarm, a display 54 which informs a driver a lens-attached matter by a lamp or character display, an image-sensing application 52 such as vehicle detection or lane detection, and a memory 60 in which a program or data for use in each process is stored.

The camera 20 includes a lens 21, an imaging element 22 which converts an image imaged by the lens 21 into analogue electric signals, and a gain adjuster 23 which adjusts a gain of the image obtained by the imaging element 22. The memory 60 can be a hard disk or an external memory which stores programs or data, or can be a memory which temporarily stores data such as RAM or ROM.

The lens-attached matter detector 30 includes an image processor 31 which accumulates image information by executing various processes to the image input from the camera 20, an attached matter determiner 32 which determines the presence or absence of lens-attached matter based on the information from the image processor 31, a vehicle information obtainer 33 which obtains vehicle information such as a vehicle speed, an output information generator 34 which generates output information to another processor based the presence or absence of lens-attached matter, and a memory 60 which stores the image information obtained by the image processor 31, the determination result by the attached matter determiner 32 or the like. In the lens-attached matter detector 30 of the first embodiment, the memory 60 provided in the vehicle system 10 is also used as a memory. The lens-attached matter detector 30 or the image-sensing application 52 can be a program which is executed by a computer having a CPU, memory, I/O, timer or the like. In the lens-attached matter detector 30, the lens-attached matter detection process is programmed, and a repetition process is executed at a predetermined cycle.

As illustrated by the solid line in FIG. 2, the image processor 31 of the first embodiment includes a process area obtainer 35 which obtains the input image from the camera 20, and sets a process area to divide the process area into a plurality of blocks, an edge extractor 36 which extracts an area having a weak edge intensity from the input image, a brightness distribution extractor 37 which extracts a brightness distribution by obtaining a brightness value of the area having a weak edge intensity and the area therearound, and a brightness change extractor 38 which obtains a time series variation in a brightness value based on the brightness value accumulated through time.

A lens-attached matter detection process in the lens-attached matter detector 30 according to the first embodiment will be described with reference to FIGS. 3-8 describing processes and the flowcharts of FIGS. 16-20. In this case, processing steps for detecting dirt as lens-attached matter will be described.

Figure 16:
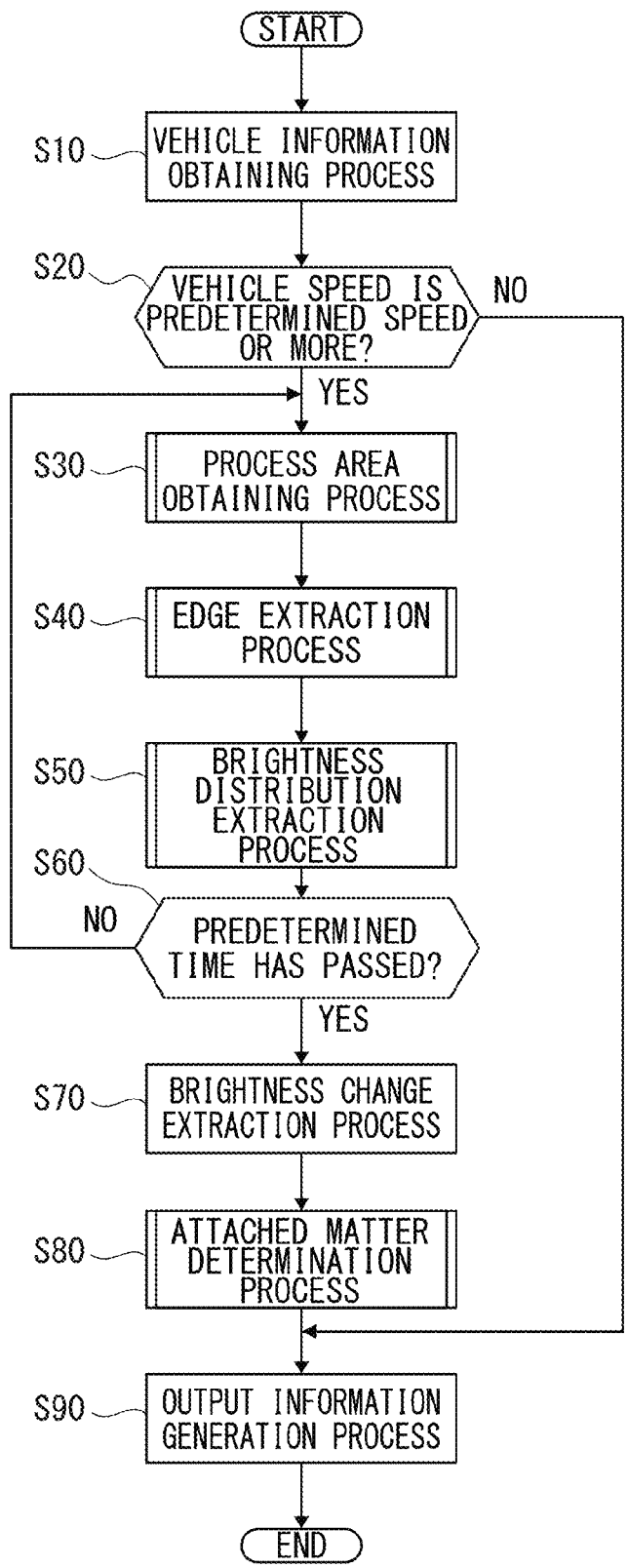
FIG. 16 is as flowchart illustrating flow of a lens-attached matter detection process in the first embodiment.
Figure 17:
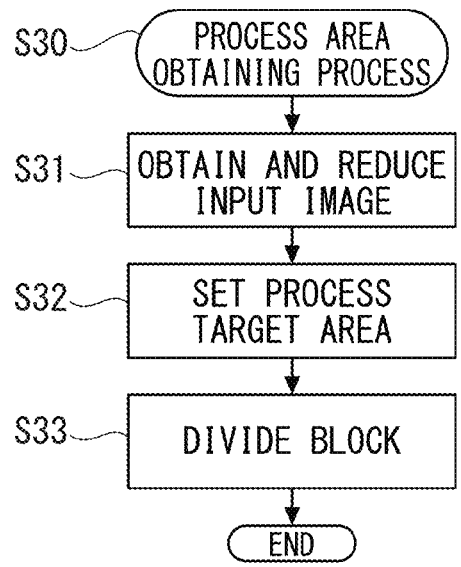
FIG. 17 is a flowchart illustrating flow of a process area-obtaining process.

As illustrated in the flowchart in FIG. 16, the lens-attached matter detection process of the first embodiment includes a vehicle information-obtaining process (step S10), vehicle speed determination process (step S20), process area-obtaining process (step S30), edge extraction process (step S40), brightness distribution extraction process (step S50), process time determination process (step S60), brightness change extraction process (step S70), attached matter determination process (step S80), and output information generation process (step S90). These processes are controlled by a controller (CPU).

(Vehicle Information-Obtaining Process and Vehicle Speed Determination Process)

The vehicle information-obtaining process (Step S10) and the vehicle speed determination process (Step S20) are executed by the vehicle information obtainer 33. The vehicle speed obtainer 33 obtains speed information sent from a speed sensor or the like (Step S10). Next, it is determined whether or not the vehicle speed is a predetermined value or more (for example, 10 km/h or more) (Step S20). When it is determined that the vehicle speed is a predetermined value or more (YES), the subroutine proceeds to the next process area-obtaining process (Step S30). When it is determined that the vehicle speed is less than 10 km/h (NO), the subroutine proceeds to the output information generation process (Step S90) after skipping the processes in Steps S30-S80. After that, the whole lens-attached matter detection process is completed. More particularly, the attachment of the dirt easily occurs while the vehicle 2 is running. For this reason, the attachment of the dirt hardly occurs while the vehicle 2 is not running or is slowly running, in which case it is determined that it is not necessary to execute the lens-attached matter detection process.

In the first embodiment, although the criteria for determining the continuation or completion of the lens-attached matter detection process is one predetermined value as described above, the present invention is not limited thereto. For example, the start and the completion can be determined based on different predetermined speeds, or the engine startup or the shift change can be used as the determination criteria. Moreover, the continuation or the completion of the lens-attached matter detection process can be determined based on vehicle information of a weather condition (for example, wet day) or a road condition (off-road running) which easily occur attachment of dirt.

(Process Area-Obtaining Process)

The process area-obtaining process (Step S30) is executed by the process area obtainer 35. The details of the process area-obtaining process will be described with reference to the flowchart in FIG. 17. The process area obtainer 35 firstly obtains the image input from the camera 20, and reduces the image (Step S31). However, the present invention is not limited thereto, and the image can be used without being reduced. However, the process speed as well as the memory capacity for image information or the like can be reduced by using such a reduced image in the subsequent processes.

Figure 3A:
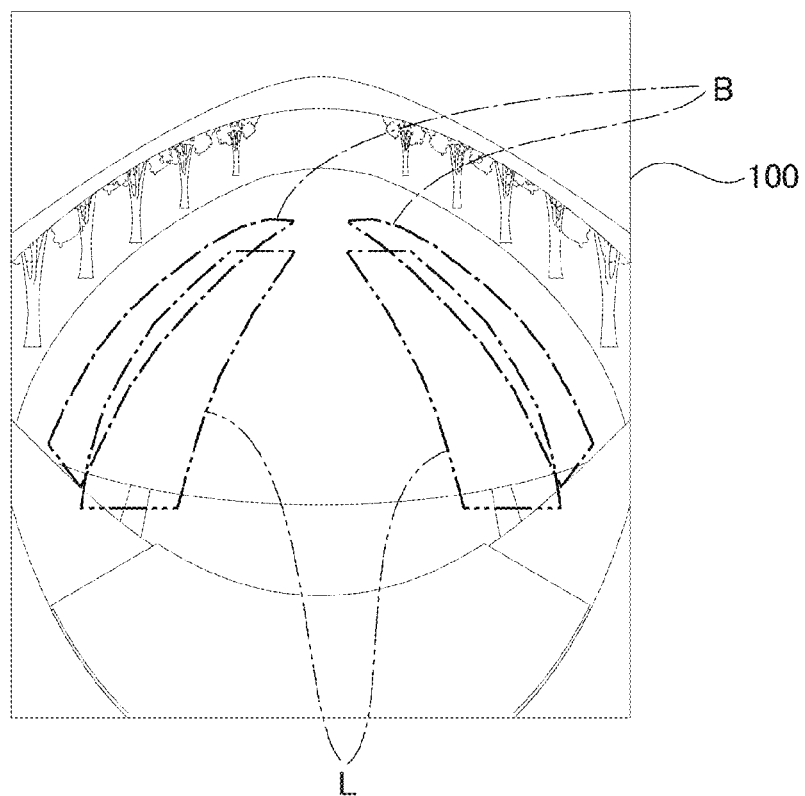
FIGS. 3A, 3B are views describing a step of blocking a process target image.
Figure 3B:
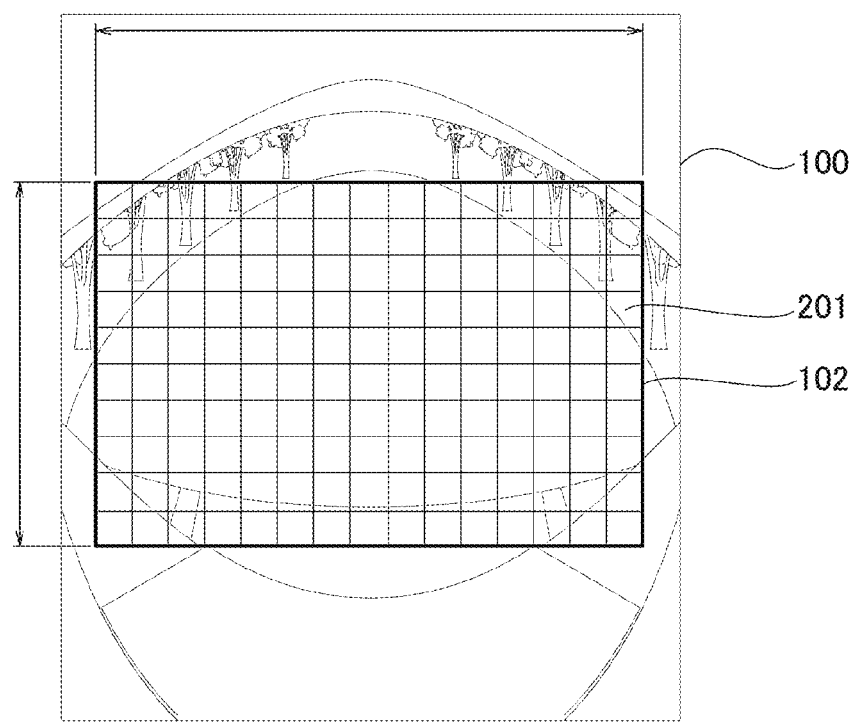

Next, the process area obtainer 35 sets a process target area from a reduced monochrome image (Step S32). The process target area can be the entire input image, but an area including the process area of the image-sensing application 52 for use in this embodiment (for example, a process area B in vehicle detection, process area L in traffic lane detection and area which determines the execution of the automatic cleaning in the cleaner 51) can be the process target area 102 in the input image 100 in this embodiment as illustrated in FIGS. 3A, 3B. The accuracy of the image-sensing application as well as the process efficiency of the lens-attached matter detection process can be improved by detecting the lens attachment in the position including at least the process area of various functions or the image-sensing application 52.

Then, this process target area is divided into a plurality of blocks 201 (Step S33) as illustrated in FIG. 3B. The subsequent processes are performed in each block, so that the subsequent processes can be effectively executed compared to a case which executes the subsequent processes in each pixel. In this embodiment, the size of each block 201 is set in a size of desired dirt to be detected or below. By this setting, only dirt can be securely and effectively detected. The block information of each divided block 201 such as coordinates is stored in the memory 60 in accordance with a block number.

(Edge Extraction Process)

Figure 18:
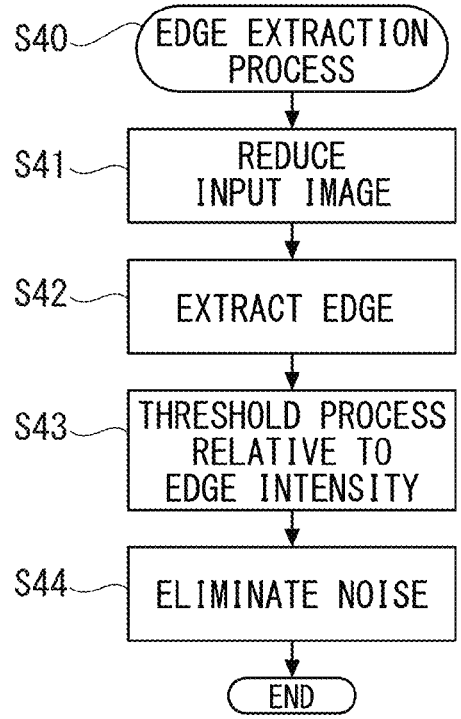
FIG. 18 is a flowchart illustrating flow of an edge extraction process.
Figure 19:
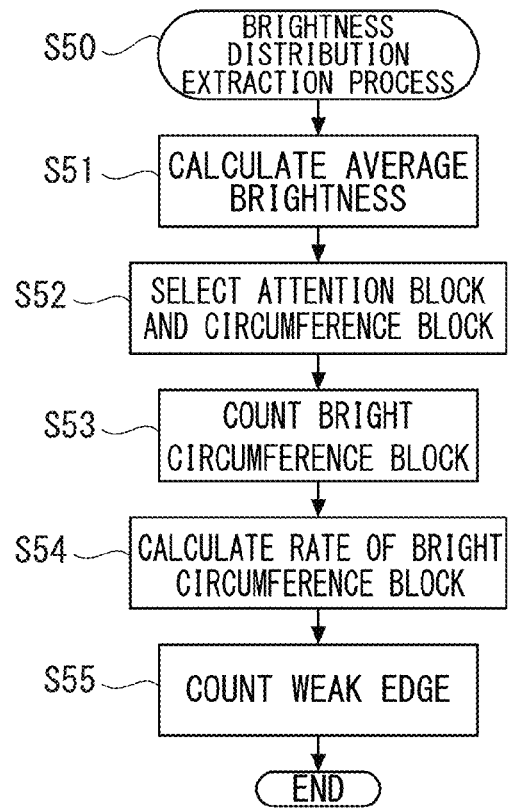
FIG. 19 is a flowchart illustrating brightness distribution extraction process.

The edge extraction process (Step S40) is executed by the edge extractor 36. The details of the edge extraction process will be described with reference to the flowchart in FIG. 18. As illustrated in FIG. 18, the edge extractor 36 reduces the input image reduced by the process area-obtaining process (Step S30), and obtains a black and white gray-scaled image (Step S41). The effective process can be executed by reducing the image as just described. Next, the edge extractor 36 executes the edge extraction of the reduced input image (Step S42). This edge extraction can be executed by using a known technique. A threshold process is executed to edge intensity by using the extracted edge image to extract only an edge required for this process, and then a binarization process is executed (Step S43). In the threshold process, an edge image having only an edge (weak edge) whose intensity $\rho$ is within a predetermined range, for example, is generated. FIG. 4 illustrates a view illustrating an edge image 103 generated from the input image 100 by the edge extraction process. Dirt portions are extracted from the input image (a) in FIG. 4 as weak edges as illustrated in the edge image (b) in FIG. 4

In addition, the dirt when running an off road differs from the dirt when running an on road in a concentration or a tone, or in a degree of weak edge intensity. The edge intensity may differ depending on a type of an attached material. For this reason, a plurality of thresholds is prepared according to such road conditions, other running conditions, types of attached materials, attachment conditions or the like, and it may be determined which threshold is used when executing the lens-attached matter detection.

Next, a noise elimination process (Step S44) which eliminates noise presenting in the generated weak edge image is executed. In this embodiment, the following edges are defined as noise.

(a) An edge in a position different from an edge position of a previously extracted edge image.

(b) An edge whose area is a predetermined value or below.

At first, the noise of the above (a) is eliminated by obtaining AND of the edge image extracted in Step S43 and the previously extracted edge image. This is because the edge which is desired to be extracted by the lens-attached matter detection process of the present embodiment is an edge of dirt attached to a lens, and such dirt attached to the lens exists in the same position for a predetermined time, so that a momentarily extracted edge may be noise. In addition, the previously extracted image indicates an edge image obtained by the previously executed edge extraction process. This process is to compare the edge image extracted by the current edge extraction process with the edge image extracted by the previous process because this process is repeated multiple times within a predetermined time. However, in the first process, there is no previous edge image, thus, the elimination of the noise (a) can be skipped.

Next, the above edge (b) whose area is a predetermined value or below is eliminated as noise. The edge of the dirt attached to the lens is assumed to be extracted as a block, so that such an independent small edge is determined as not being dirt. By executing the above noise elimination, the lens-attached matter can be detected with high accuracy.

(Brightness Distribution Extraction Process)

Figure 5:
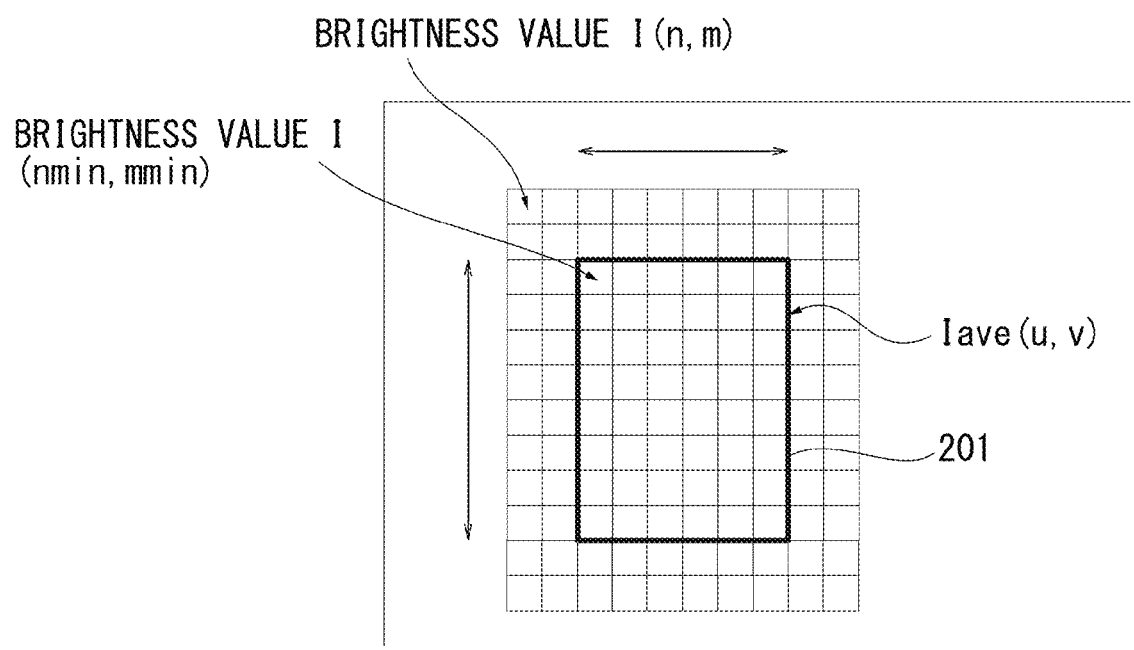
FIG. 5 is a view describing a step of obtaining a brightness average of process blocks.

The brightness distribution extraction process (Step S50) is executed by the brightness distribution extractor 37. The details of the brightness distribution extraction process will be described with reference to the flowchart in FIG. 19 and FIGS. 5, 6A, 6B. At first, in the brightness distribution extractor 37, as illustrated in FIG. 5, an average brightness value $I_{ave}$ of a brightness value I of pixels in each block set and divided by the setting process for the process target area is calculated by the following expression (1) (Step S51). In the following expression (1), u, v denote x, y coordinates in a block, N, M denote the number of pixels in the x direction (horizontal) and in the y direction (vertical) in a block, n, m denote a position (relative coordinates) of the x direction (horizontal) and y direction (vertical) of a pixel in a block, and $n_{min}$, $m_{min}$ denote the coordinates of the first pixel in a block. In addition, the brightness value uses a gray-scaled image before binarization.

[Expression 1]

$$Iave(u, v) = \frac{1}{N \times M} \sum_{n=0}^{N-1} \sum_{m=0}^{M-1} I(n_{min} + n, m_{min} + m) \quad (1)$$

Figure 6A:
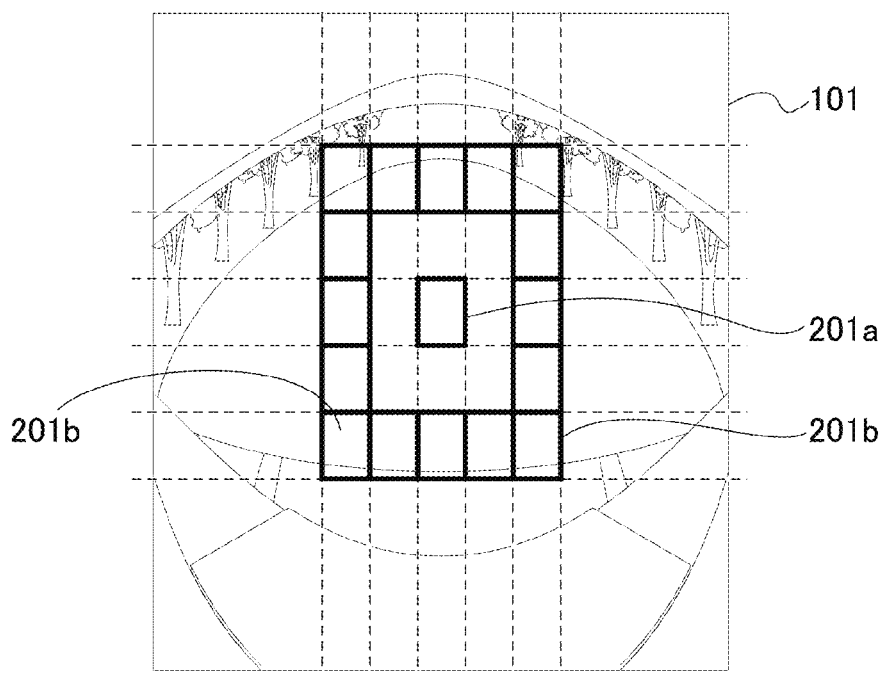
FIGS. 6A, 6B are views describing a step of counting a bright circumference block.

Next, in the brightness distribution extraction process, an attention block and blocks around the attention block (hereinafter referred to as a circumference block) are selected (Step S52) based on the average brightness value of each block calculated by the above equation (1). A block 201a illustrated by a thick line in FIG. 6A is the attention block. This attention block 201a is selected from blocks 201 having a low average brightness value. Namely, the brightness value of the area where dirt is attached is likely to be smaller than the average brightness value of the area where dirt is not attached. For this reason, in the lens-attached matter detection process of the present embodiment, this tendency is used as a feature of dirt, and the attachment of dirt is determined in the subsequent attached matter determination process.

The circumference blocks 201b located in the outer circumferences of the blocks 201 adjacent to the attention block 201a in the outer circumference of the attention block 201a are selected as the circumference blocks 201b. This is because the dirt often attaches not only to one block but also to the adjacent blocks, so that it is considered that there is no difference in an average brightness value between the attention block 201a and the blocks adjacent to the attention block. Therefore, the blocks outside the adjacent blocks are selected as the circumference blocks 201b. In addition, the present invention is not limited thereto. When the attachment area of the attached material is small, the blocks 201 adjacent to the attention block 201a can be selected as the circumference blocks 201b. When the attachment area of the attached material is large, the blocks away from the attention block by several blocks can be selected as the circumference blocks 201b.

As described above, after selecting the attention block 201a and the circumference blocks 201b, the number of the circumference blocks 201b having an average brightness value higher than that of the attention block 201a is counted (Step S53). In this case, the number of circumference blocks is counted by using the gray-scaled image before binarization. Next, the ratio of the bright circumference block 201b (the number of bright circumference blocks/the total number of circumference blocks) is calculated (Step S54). As a result, regarding a block having dirt (attention block 201a), the ratio of the number of bright circumference blocks having a high average brightness value is increased.

Figure 7:
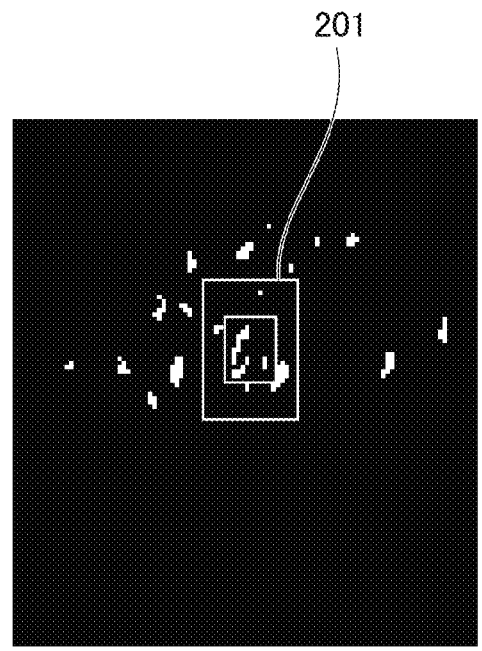
FIG. 7 is a view describing a step of counting the number of weak edges, and also is a schematic view illustrating a block having a weak edge.

Next, the weak edge is counted (Step S55) by using the edge image extracted by the edge extraction process (step S40). The counting of this weak edge is executed by using the image after binarization. The dirt attached to the lens is likely to be blurred without being focused and present as a block of weak edges. For this reason, in the lens-attached matter detection process of the present invention, the number of weak edges is counted in each block. FIG. 7 illustrates an image of weak edges. In this block, the weak edges are present in a portion surrounded by the inside white line. The number of the counted weak edges is stored in the memory 60.

(Process Time Determination Process)

After the above process is completed to one input image, the process time determination process (Step S60) in FIG. 16 is executed by the controller. When it is determined that a predetermined time has passed, the subroutine proceeds to a next brightness change extraction process (Step S70). When a predetermined time has not passed, the process area-obtaining process (Step S30), edge extraction process (Step S40) and brightness distribution extraction process (Step S50) are repeated. By repeating Steps S30-S50 multiple times within a predetermined time, information such as the average brightness value, the ratio of bright circumference blocks and the number of counted weak edges are accumulated in the memory 60 in chronological order. In this embodiment, the process is executed twenty times at intervals of one second to accumulate the information. In addition, this time can be freely set according to the vehicle information such as a type or vehicle speed or other conditions. For example, during off-road running on a rainy day, attachment of dirt occurs very often. Accordingly, it is possible to detect dirt in a short period of time whereas smooth warning is required. For this reason, it is preferable to set a short period of time. On the other hand, during off-road running on a sunny day, attachment of dirt hardly occurs. Accordingly, it is preferable to set a long period of time because it is preferable to accumulate information for a long period of time in order to achieve highly accurate detection.

(Brightness Change Extraction Process)

Figure 8:
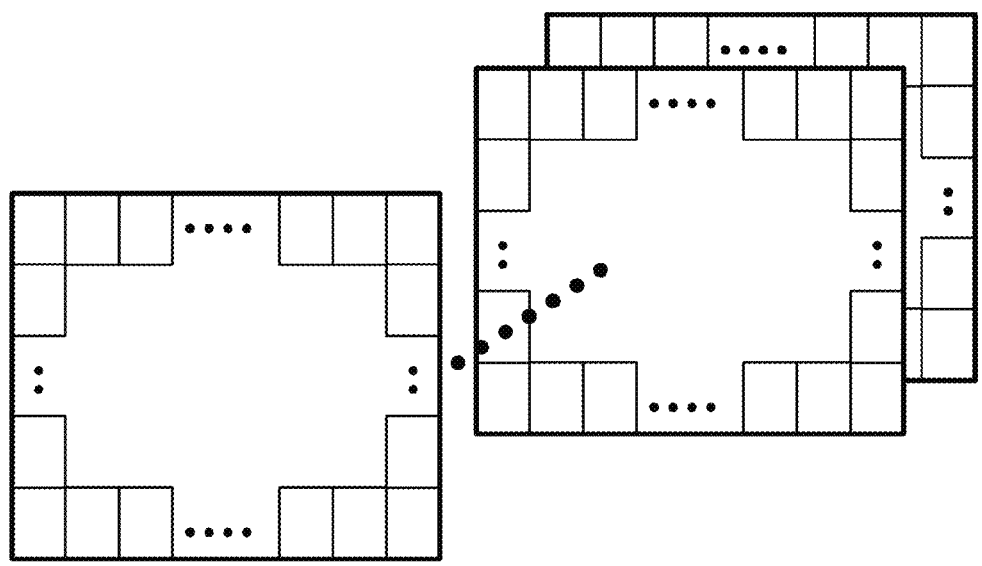
FIG. 8 is a view describing accumulation of brightness value information in chronological order, and illustrating an image of record which is recorded in a memory.

The brightness change extraction process (Step S70) is executed by the brightness change extractor 38. The details of the brightness change extraction process will be described with referent to FIG. 8. The dirt attached to the lens hardly moves over time, and the permeability of the dirt is low. For this reason, a variation in the brightness values in the time direction within the range is reduced. In order to find out a change in pixel values in the time direction, the average brightness value (representative brightness value of block) for a predetermined time is accumulated in the memory 60. In other words, the average brightness value obtained in the brightness distribution extraction process of Step S50 is accumulated in the memory 60 with respect to each block. FIG. 8 illustrates an image of record of the average brightness value of each block at regular time intervals.

The representative brightness value E with respect to each block is calculated by using the following expression (2) based on the accumulated average brightness value. In the following equation (2), $I_{ave}$ denotes an average brightness value of a block, i denotes a block number, and N denotes a predetermined time (process time).

[Expression 2]

$$E(i) = \sum_{n=0}^{N-1} Iave(i) \quad (2)$$

Next, the variance V in the time direction is calculated with respect to each block by using the following expression (3) based on the average brightness value with respect to each block calculated by the above expression (2). Namely, the variance in the time direction is calculated by using the representative brightness value for one cycle previously processed and accumulated in a predetermined time. The variance V of the representative brightness value in the time direction is calculated with respect to each block. In the following expression (3), $I_{ave}$ denotes an average brightness value of a block, i denotes a block number, and N denotes a predetermined time (process time).

[Expression 3]

$$V(i) = \frac{1}{N} \sum_{n=0}^{N-1} (Iave(i) - E(i))^2 \quad (3)$$

(Attached Matter Determination Process)

Upon completion of the process for the accumulated information, next, the attached matter determination process (Step S80) is executed by the adhered matter determiner 32. In this embodiment, since dirt is detected, the attached matter is limited to dirt in this process. However, the attached matter is not limited to dirt in the present invention as a dirt determination target, and dirt can be read as each attached matter, for example, a waterdrop determination target.

Figure 20:
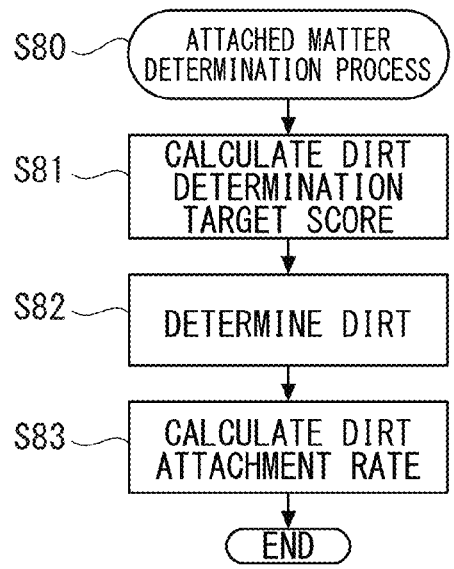
FIG. 20 is a flowchart illustrating flow of an attached matter determination process.

The details of the attached matter determination process will be described with reference to the flowchart in FIG. 20. At first, the score of the dirt determination target is calculated with respect to each block (Step S81) based on the following information accumulated in the memory 60.

(a) The number of counted weak edges
(b) Ratio of the number of bright circumference blocks in circumference blocks
(c) Variance of an average brightness value with respect to each process block More particularly, in the attention block in which the number of counted weak edges is less than a threshold, the score of the dirt determination target is not counted due to a low attachment rate of dirt. When the ratio of the number of bright circumference blocks in the circumference blocks is higher than the threshold, the adding rate of the score is increased. Moreover, when the variance of the average brightness value with respect to each block is within a predetermined range, the adding rate of the score is increased.

Next, the dirt determination is executed (Step S82) based on the following information. The dirt is determined when any of the following conditions is satisfied.

(a) Score of dirt determination target is a threshold or more
(b) Variance value with respect to each process block is a threshold or below In the present embodiment, after determining dirt, the output information is generated in the after-described output information generation process, so as to send the dirt information to the cleaner 51 or the image-sensing application 52 such as vehicle detection or lane detection. In the dirt determination, the following information is calculated as determination results for use in the output information generation process. The calculation result is stored in the memory 60.

(a) Dirt determination result with respect to each process block (attachment of dirt/no attachment of dirt)
(b) Dirt area on process block (unit: block)

Next, the following dirt attachment rates are calculated based on the dirt determination result (Step S83). In addition, the following information is an example, and arbitrary information can be calculated by the image-sensing application (for example, moving vehicle detection or parking frame recognition) using dirt attachment information or a way of dealing with dirt.

(a) Dirt attachment rate in process area in lane detection
(b) Dirt attachment rate in process area in vehicle detection
(c) Dirt attachment rate in process block of automatic cleaning execution determination area (Output Information Generation Process)

The output information generation process (Step S90) is executed by the output information generator 34. In this case, the output information for sending to another application or device is generated based on various information calculated in the attached matter determination process. In addition, when the process determined as NO in the vehicle speed determination process (Step S20) is skipped, the output information (for example, clear information) indicating that the lens-attached matter detection process is performed is output.

For example, the cleaner 51 performs the cleaning process for a lens based on the output information from the lens-attached matter detector 30. The alarm generator 53 and the display 54 draw a driver's attention by generating an alarm and displaying a warning lamp and a warning character. Moreover, in the image-sensing application 52 such as vehicle detection, traffic lane detection or the like, the output information is used for the determination information of each process. A process to be executed by sending information to any of these devices or applications is arbitrary and appropriately selected depending on the configurations of the vehicle system 10.

As described above, in the first embodiment, the presence or absence of the attachment of the dirt can be detected with high accuracy. Consequently, for example, dirt on a lens can be effectively informed to a driver, automatic cleaner or the like so as to smoothly eliminate lens-attached matter, and an image-sensing application such as vehicle detection using a camera can be preferably performed so as to enable high-performance vehicle running. Since attached matter is detected by both of a brightness value and variation with time, an imaging object except lens-attached matter such as a landscape, guide rail, parapet, or sidewalk is eliminated from the attention area, so that highly accurate detection can be achieved. As a result, it becomes unnecessary to inform a driver about dirt in an undesirable manner or to perform automatic cleaning, so that effective preferable vehicle running can be effectively performed.

In addition, in the first embodiment, in the edge extraction process or the brightness distribution process, each extraction data is stored and accumulated in the memory 60, and a statistic process is executed in the brightness change extraction process after the elapse of a certain period of time. However, the present invention is not limited thereto, the brightness change extraction process can store the data extracted by the edge extraction process or the brightness distribution process. Moreover, the brightness change extraction process can monitor a time with a timer, and execute the statistic process after the elapse of a certain period of time.

Second Embodiment

A vehicle system including a lens-attached matter detector according to the second embodiment will be described. The configurations of the vehicle system in the second embodiment are the same as those of the vehicle system in the first embodiment except that the vehicle system in the second embodiment includes a mask processor which controls false detection. Therefore, the configurations of the vehicle system of the second embodiment will be described with reference to FIG. 2, and the same reference numbers are applied to the configurations which are the same as those in the first embodiment; thus, the detailed description thereof will be omitted.

As illustrated in FIG. 2, the vehicle system 10 including a lens-attached matter detector of the second embodiment includes the camera (imaging device) 20, lens-attached matter detector 30, cleaner 51, image-sensing application 52, alarm generator 53, display 54, and memory 60.

The image processor 31 of the second embodiment includes the process area obtainer 35, edge extractor 36, brightness distribution extractor 37, brightness change detector 38, and a mask processor 39 as illustrated by the solid line and the dotted line in FIG. 2.

The lens-attached matter detection process in the lens-attached matter detector 30 according to the second embodiment will be described with reference to the drawings. In this embodiment, dirt is detected as lens-attached matter. The same description and the same flowcharts are used for the processes similar to those in the first embodiment.

Figure 21:
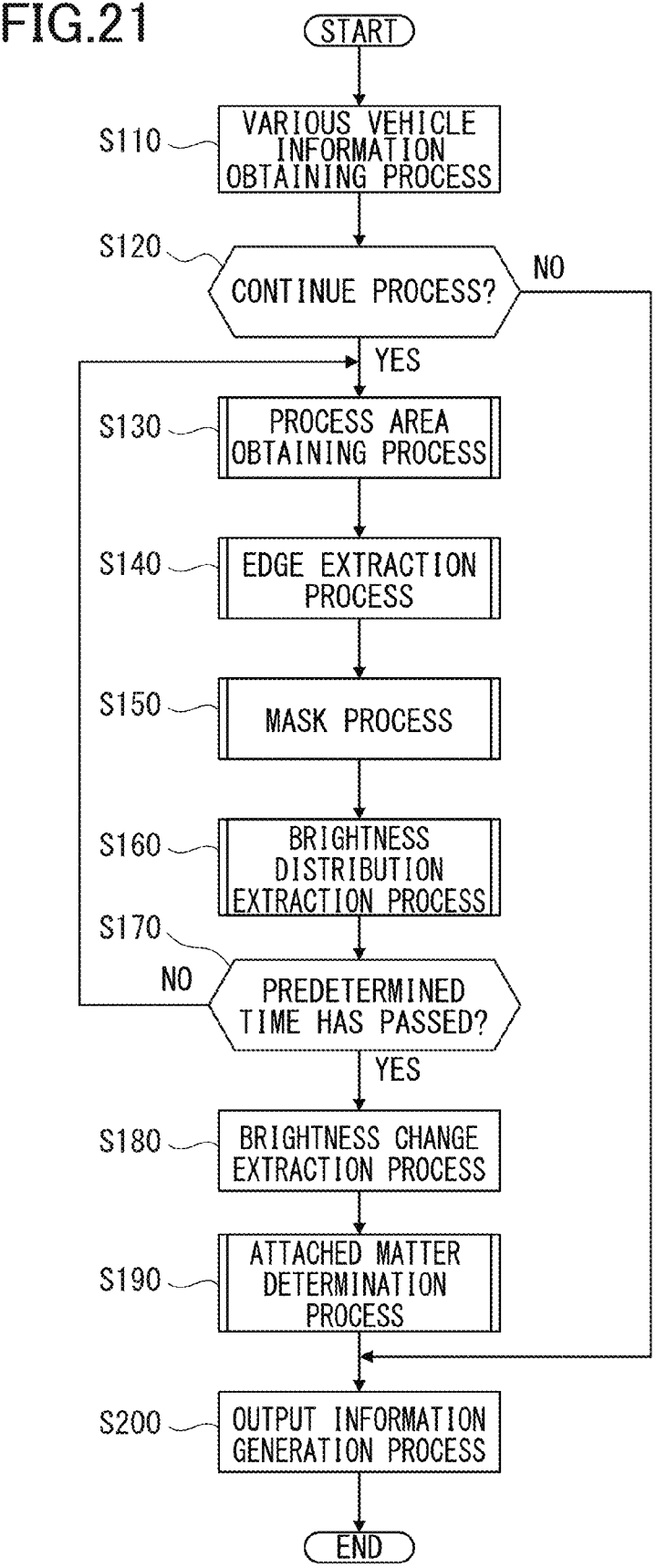
FIG. 21 is a flowchart illustrating flow of a lens-attached matter detection process in the second embodiment.

As illustrated in the flowchart in FIG. 21, the lens-attached matter detection process of the second embodiment includes a various vehicle information-obtaining process (Step S110), process prosecution determination process (Step S120), process area-obtaining process (Step S130), edge extraction process (Step S140), mask process (Step S150), brightness distribution extraction process (Step S160), process time determination process (Step S170), brightness change extraction process (Step S180), attached matter determination process (Step S190), and output information generation process (Step S200). These processes are controlled by the controller (CPU).

(Various Vehicle Information-Obtaining Process)

In the various vehicle information-obtaining process (Step S110), at first, various vehicle information such as vehicle speed information, on-road or off-road information, or day-and-night information is obtained. Weather information such as sunny, rain or snow can be obtained. The on-road or off-road information can be obtained by any device. It can be determined based on the image of the camera 20 or the GPS information, for example, or can be determined based on car navigation information. The day-and-night information is determined based on the gain adjustment value by the gain adjuster 23 relative to the image obtained by the imaging element 22 of the camera 20. The increase in the gain adjustment value relative to the image indicates that a dark image is obtained, which can be determined as night-time. On the other hand, the decrease in the gain adjustment value indicates that a bright image is obtained, which can be determined as day-time. The vehicle speed information is obtained from the signal information from the vehicle speed sensor. The weather information can be determined based on rainfall by using a driving signal of a windshield wiper or can be obtained from car navigation information including a communication function, or the like.

(Process Prosecution Determination Process)

In the process prosecution determination process (Step S120), it is determined whether or not the lens-attached matter detection process is prosecuted based on the obtained various vehicle information. In the day-and-night determination, when it is determined as a daytime based on the gain adjustment, the cleaning determination is performed. When it is determined as night-time or the like in addition to day-time, the processes in Steps S130-S190 are skipped, and the sub-routine proceeds to the output information generation process (Step S200), and then, the whole processes are completed.

In the second embodiment, the lens-attached matter detection process is activated with the engine startup or the running start of the vehicle 1 as a trigger, and the prosecution, completion, and interruption of the above-described lens-attached matter detection process are determined based on day and night and the cleaning condition. However, the present invention is not limited thereto. Any condition can be a determination target according to the running condition or the like. For example, as described in the first embodiment, the determination can be made based on the vehicle speed. The determination can be made based on an on road or an off road, and the present process can be activated in an off road, for example.

(Process Area-Obtaining Process)

The process area-obtaining process (Step S130) is performed by the process area obtainer 35, and the process target area is set from the input image from the camera 20 so as to be blocked. In this embodiment, an area including the process area in the vehicle detection, the process area in the lane detection and the automatic cleaning determination area is set as a process target area. Since the outline of the process area-obtaining process is similar to that of the first embodiment, the detailed description thereof will be omitted.

(Edge Extraction Process)

The edge extraction process (Step S140) is performed by the edge extractor 36 and the mask processor 39. The edge extraction process in the present embodiment is a process similar to that in the first embodiment except that the edge extractor 36 extracts an edge in the edge extraction (step S42) by using an image in which a lane marker (hereinafter, referred to as a lane) is masked by the mask processor 39. Therefore, the detailed description for the same processes is omitted, and the mask process will be only described in this embodiment. An image of a lane indicated on a road is sharply shot by the camera 20, so that a weak edge is hardly detected in the border with the road. However, when the lane is unclear or tainted, the edge portion of the lane may be blurred, and the weak edge may be sometimes detected, so that it becomes difficult to discriminate the weak edge of the lane from the weak edge of the lens-attached matter. For this reason, the mask process for the lane is executed for improving the detection accuracy of the lens-attached matter.

Figures 9A, 9B, 9C:
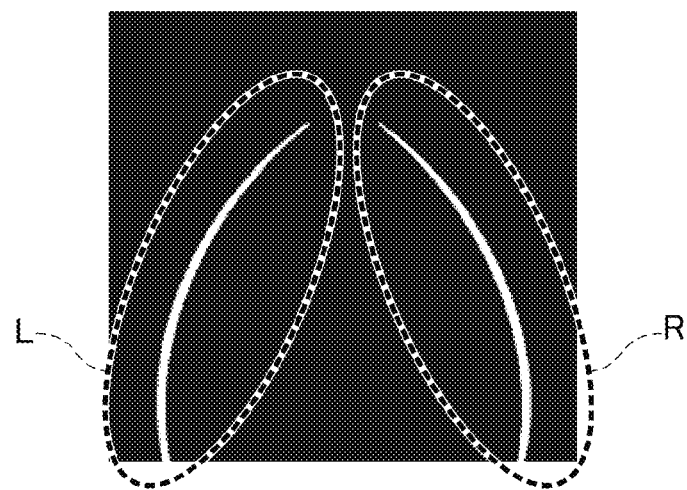
FIGS. 9A, 9B, 9C are views describing a mask process for a lane.

The mask process for the lane will be described with reference to FIGS. 9A-10. FIG. 9C illustrates the image of the lane on the shot image (real view) of the back of the vehicle. In order to control the edge extraction of symmetrical lanes L, R generating from a vanishing point, the image is divided into half right and left, and a filter for the left half image and a filter for the right half image are applied. A left area edge filter (edge filter whose brightness is increased from the upper right to the lower left) illustrated in FIG. 9A is a filter for avoiding the extraction of the edge of the lane in the L-portion in FIG. 9C. A right area edge filter (edge filter whose brightness is increased from the upper left to the lower right) illustrated in FIG. 9B is a filter for avoiding the extraction of the edge of the lane in the R-portion in FIG. 9C. The edge filters are for decreasing noise edges by increasing a size of a filter.

As illustrated in FIG. 10, after controlling the lane by applying the right area filter and the left area filter to the input image divided right and left, the edge of the right area and the edge of the left area are extracted. By combining the edge images independently obtained in the right area and the left area, the edge image is generated. In addition, the mask for the lane can be performed when executing the mask process for the after-described light source or the like. However, by masking the lane with a process which extracts the edge image, the edge extraction process can be improved and the speed of the edge extraction process can be improved, and these processes can be improved because it becomes unnecessary to count an unnecessary edge in the subsequent processes.

Next, the threshold process and the binarization process are executed based on the weak edge image generated above to execute the noise elimination (refer to Steps S43, S44 in FIG. 18). These processes are similar to those in the first embodiment; thus, the detailed description thereof will be omitted.

(Mask Process)

The mask process (Step S150) is performed by the mask processor 39. In this embodiment, the mask process for a track and the mask process for a light source are executed. The details of the mask process will be described with reference to FIGS. 11-12B.

The various processes for producing a track mask image illustrated in FIG. 11 will be described. Tracks generated on a road surface include a snow track or a rain track. In an off-road, a track due to a tire track on a road surface is generated. The contours of these tracks are sometimes extracted as weak edges, and it may be difficult to distinguish the weak edges of the counters of the tracks from the weak edge of the dirt. For this reason, the weak edge extraction may be affected (noise), so that the area including the tracks is masked in order to effectively and highly accurately extract the weak edge. In addition, the tracks are likely to be generated during off-road running on a snow day or a rain day. Therefore, during on-road running on a clear day which hardly generates tracks, the track image process and the track mask process can be skipped. Depending on the difference of these conditions, the contrasting density of a track is changed, so that the parameter for use in the generation process of the mask image can be adjusted in accordance with the difference in the conditions.

Figure 11C:
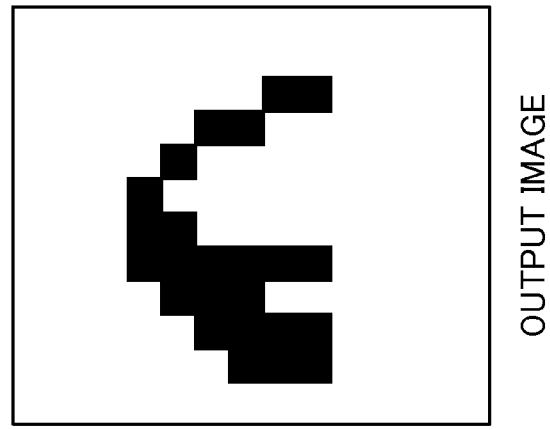
FIG. 11 is a view describing a mask process for a track, and illustrating an input image (a) having a track, an image (b) in which the input image is divided into a plurality of frames, and the edges are detected, and a track mask image (c) generated by a mask processor, and an output image.
Figure 11B:
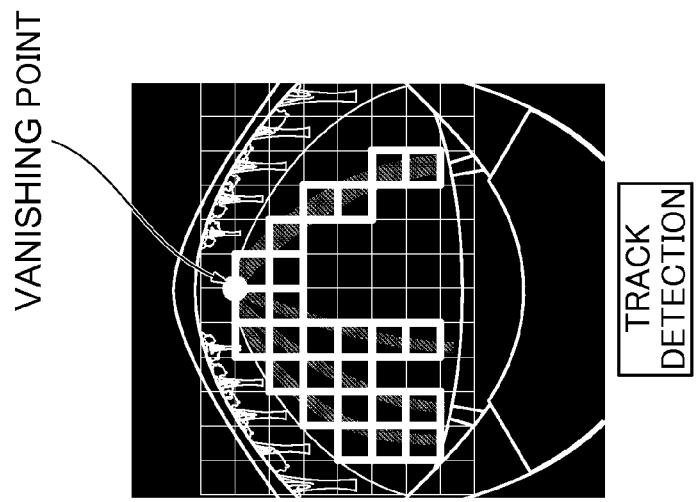
Figure 11A:
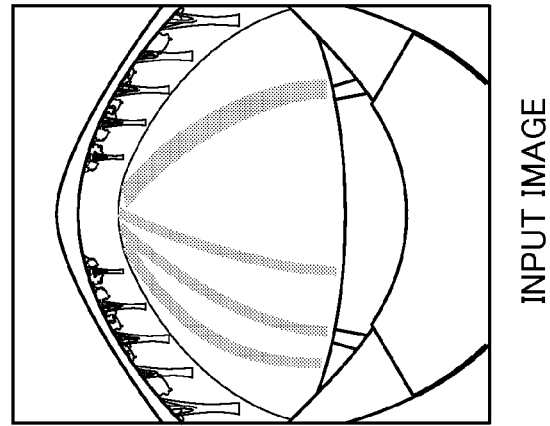

In the track detection, the contour position of the track is specified in the input image illustrated in (a) of FIG. 11. In order to specify the contour position of the track, the input images for a predetermined time are compared, and the area where the weak edges are temporarily and spatially continued in the vehicle traveling direction is detected. The process target area is divided into a plurality of small frames, and the pixels which detect the edges two frames in a row are displayed by white as illustrated in (b) of FIG. 11. A line in which the edges are continued in the Z axis direction on the world coordinate (in this case, the X axis is the vehicle width direction, the Y axis is the vertical direction, and the Z axis is the vehicle traveling direction) is extracted, and this line is set as the mask target area. The mask image obtained by this process is illustrated in (c) of FIG. 11. The details of these processes will be described below.

At first, the process target area is divided into a plurality of small frames as illustrated in (b) of FIG. 11, and the presence or absence of the edge in the frame is confirmed, and counted. Moreover, the projection in which each frame is arranged on the Z axis and the X axis on the world coordinate is obtained. In this case, the presence or absence of the edge (0/1) not the number of edges is projected.

Next, the presence or absence of the track is determined with respect to each line based on the above tract detection data. The track determination is performed according to the following procedures by using the number of areas having an edge projected on the X axis.

(A) Track Determination

In this determination, the determination differs between the outer edge portion of the process target area and the portion except the outer edge portion. In addition, the outer edge portion is defined as a predetermined area of the left end side and a predetermined area of the right end side in the X-axis projection. In the portion except the outer edge portion, it is determined that the line includes the track when satisfying the following conditions (a), (b). In the outer edge portion, it is determined that the line includes the track when satisfying the following condition (c).

(a) The number of areas having an edge in a line is threshold 1 or more.

(b) Two lines each on the right and left sides in a line include a line in which the number of areas including an edge in a line is less than threshold 2.

(c) The number of areas including an edge in a line is threshold 3 or more.

(B) Track Continuation Determination

In the determination of the above (A), in a case that no track is determined (in a case that the conditions of the above (A) are not satisfied), and a track is recently detected, the track determination of the line is continued when satisfying both of the following conditions (d), (e). A period for continuing a track is twice (one second), and the continuation period is reset when the track determination is continued by this process.

(d) The number of areas having an edge in a line is ½ or more of threshold 1.

(e) Two lines each on the right and left sides in lines include a line in which the number of areas having an edge is less than ½ of threshold 2.

An image which masks a line determined as including a track is produced based on the track detection result. The mask image is produced in accordance with the following procedures. The track mask image illustrated in (c) of FIG. 11 is produced in accordance with the following procedures.

(a) The output image is filled with white.

(b) When there is a line determined as the presence of a track, that area is blacked out.

Figure 12B:
FIGS. 12A, 12B are views describing a mask process for a light source.
Figure 12A:
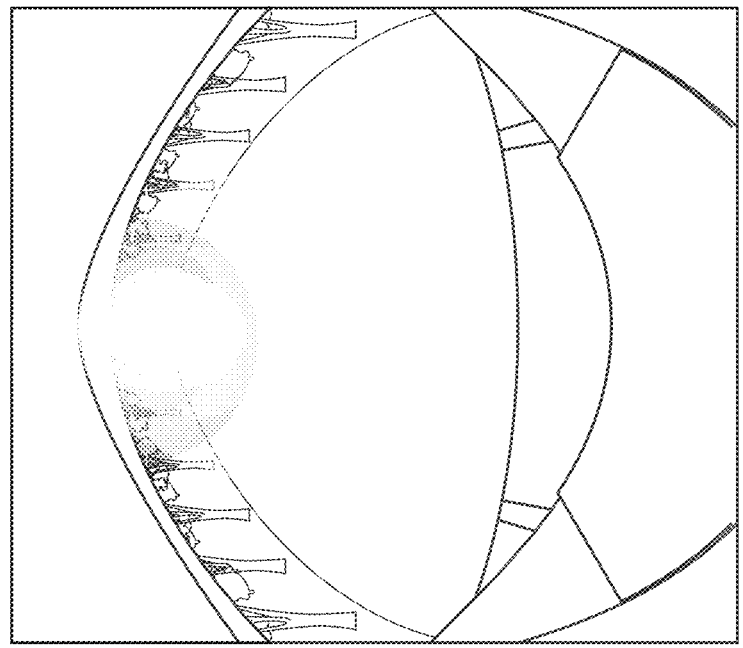

Next, the various processes for masking an area including a light source will be described. When a light source such as sun exits at the back of the own vehicle, the weak edge of the light source is detected in the boarder of the road surface reflection area. This weak edge due to the light source is hardly distinguished from the weak edge of the dirt, and may affect the performance of the lens-attached matter detection process. The mask process for the light source is executed for controlling such a negative influence. FIG. 12A illustrates the image of the light source and the road surface reflection. FIG. 12B illustrates the light source mask image in which the light source is masked. A procedure for producing the light source mask image relative to such an input image is described as follows.

The following information is used in this embodiment as information of a light source area.
  (a) West sun determination result
  (b) Diffusion and reflection area Since the information of the above (a), (b) is an area including a predetermined brightness value or more, the light source area can be obtained by binarizing the input image with a predetermined brightness value. In addition, the information of the light source area is not limited thereto, and other information can be used. As described above, in the process block which overlaps with the light source area, the score of the dirt determination target is cleared. Namely, when executing the after-described attached matter determination process, the process block which overlaps with the light source area is set aside for counting, so that the area (light source area) except the dirt is prevented from being counted.

Figure 13:
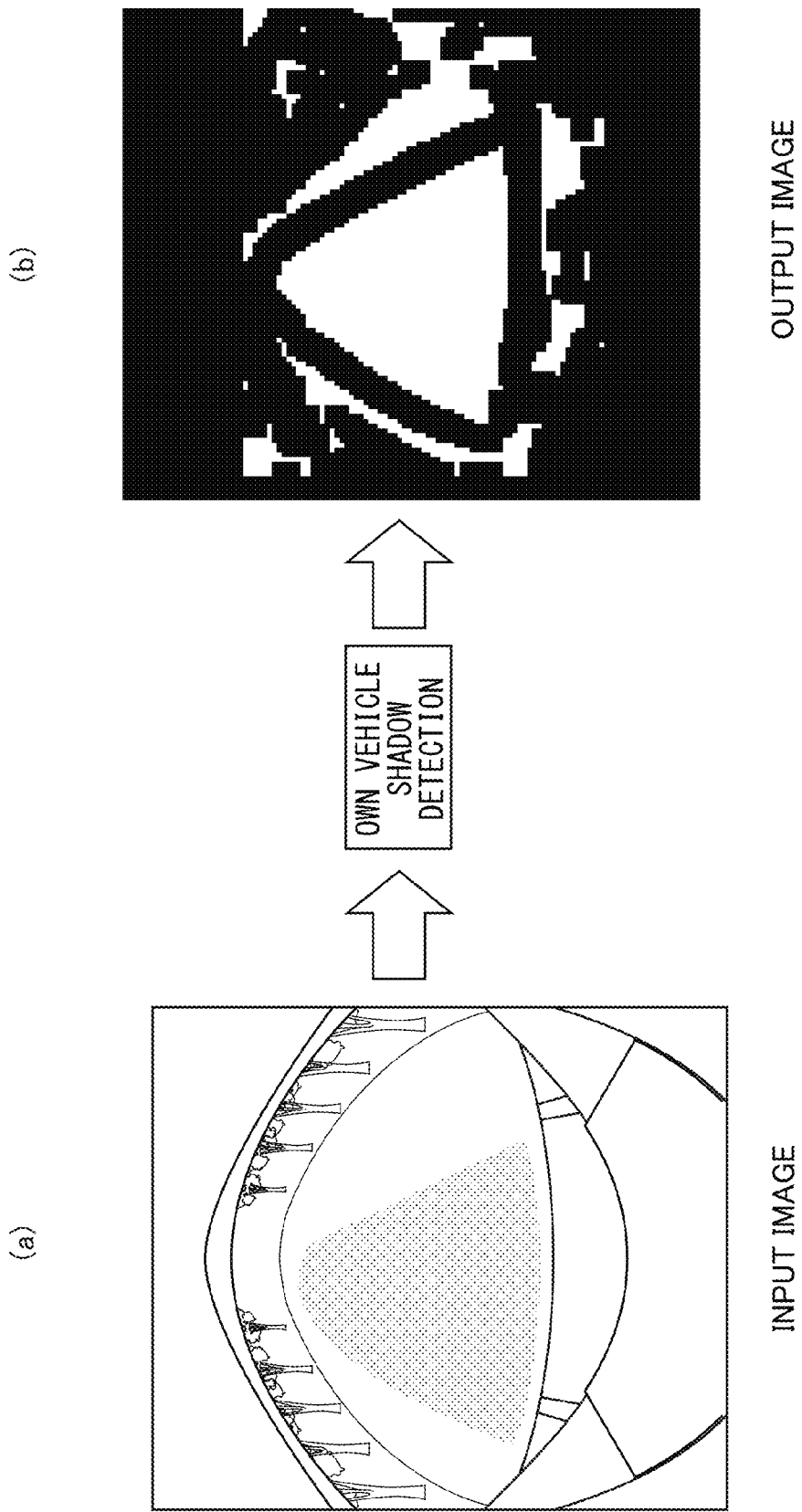
FIG. 13 is a view describing a mask process for an own vehicle shadow, and illustrating an input image (a) having an own vehicle shadow and an own vehicle shadow mask image (b) generated by the mask processor.

As described above, in the present embodiment, the mask process is executed for the area including a track and the area including a light source. However, the present invention is not limited thereto, and any target which can be noise can be masked for effectively and highly accurately extracting an edge. Another example of a mask target includes own vehicle shadow illustrated in FIG. 13 and a vehicle body illustrated in FIG. 14. The own vehicle shadow is masked because the weak edge is detected by the contour of the own vehicle shadow, and such detection affects the detection of the weak edge of the dirt. For this reason, in this process, as illustrated in FIG. 13, a mask image for masking the contour of the own vehicle shadow is created. Moreover, the own vehicle shadow generated in the input image is not fixed, and the projected image generated on the image differs according to a time or a direction. In this case, the mask image is created by accumulating the input images for a predetermined time, and specifying the own vehicle shadow from the portion without having a change over time. The own vehicle shadow can be specified based on the shape of the projected image or the previously prepared sample image of the own vehicle shadow. There may be a case in which the contour of the shadow changes in accordance with intensity of light depending on weather, or the shadow is not obtained on a cloudy day or the like. For this reason, the process of creating the mask image of the own vehicle shadow can be changed or can be skipped based on the weather information.

Figure 14:
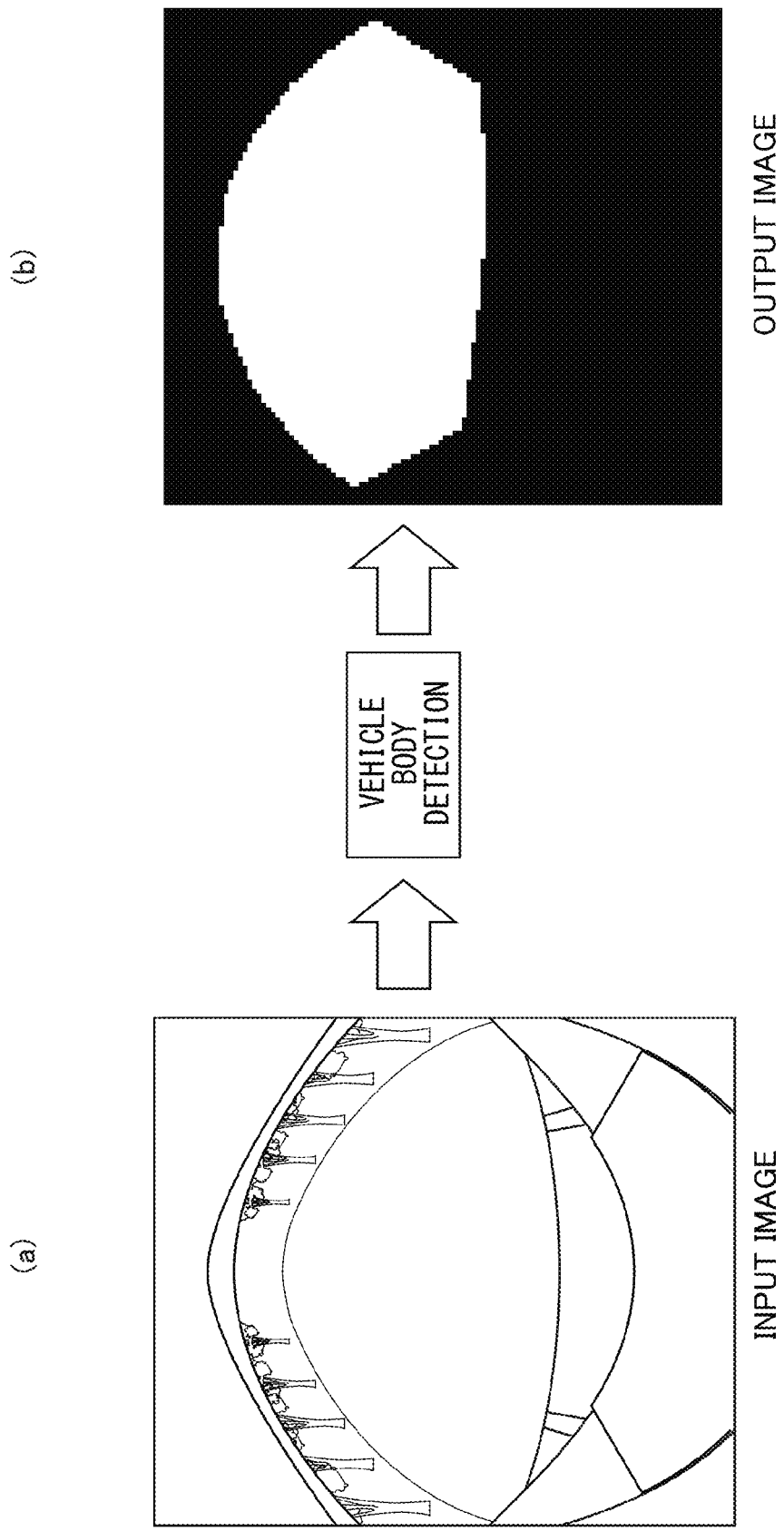
FIG. 14 is a view describing a mask process for a vehicle body, and illustrating an input image (a) having a vehicle body and a vehicle body mask image (b) generated by the mask processor.
Figure 15:
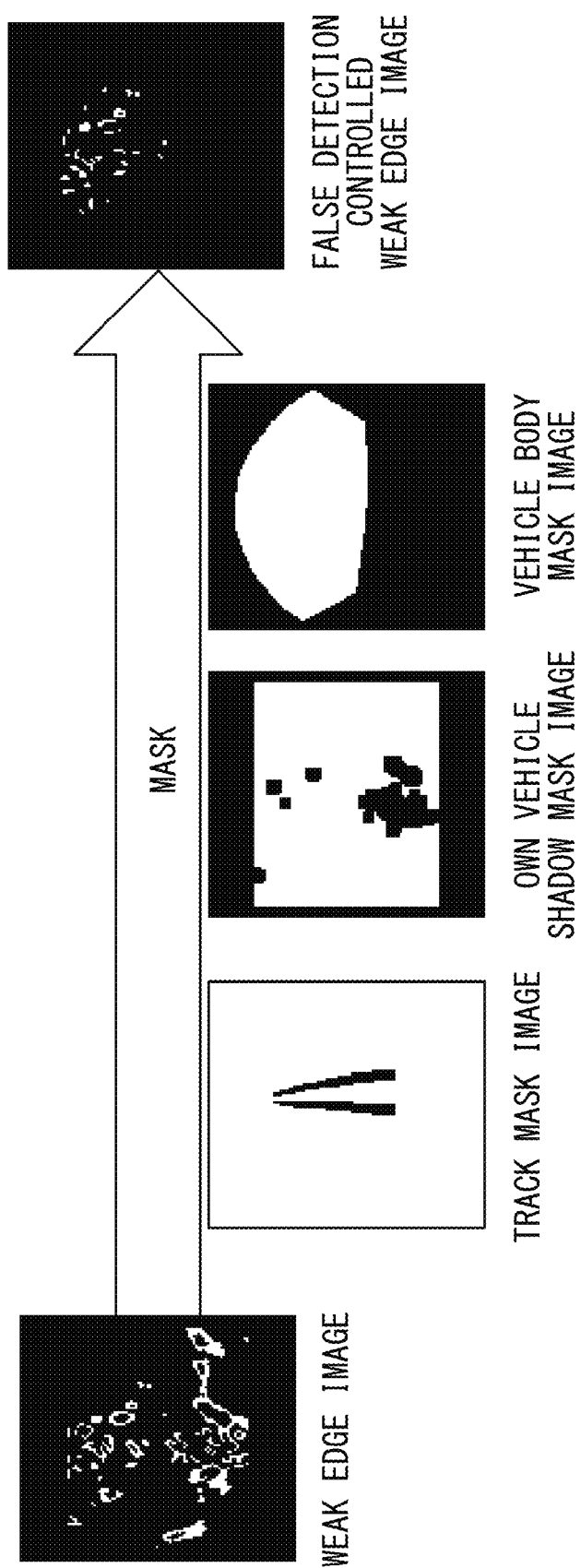
FIG. 15 is a schematic view illustrating a weak edge image before the mask process and a weak edge image after the mask process.

In contrast to this, since the image of the vehicle body is fixed based on the attachment position of the camera 20 or the like, it becomes unnecessary to execute a time-dependent process, and the mask image illustrated in FIG. 14 may be prepared in advance. The image of the vehicle body can be obtained from the input image as an initial process upon the activation of the lens-attached matter detection process, and the mask image can be created. As described above, the mask process for a lane can be executed in this step. FIG. 15 illustrates the weak edge image before the mask process and the weak edge image after the mask process. FIG. 15 illustrates the images after the mask process by creating the track-masked image, own vehicle shadow-masked image and vehicle body-masked image.

(Brightness Distribution Extraction Process)

The brightness distribution extraction process (Step S160) is executed by the brightness distribution extractor 37. The brightness distribution extraction process in the second embodiment is similar to that in the first embodiment except that the process is not executed for the masked block. Consequently, the detailed description of the similar processes is omitted, and the process different from that in the first embodiment will be described below.

Figure 6B:
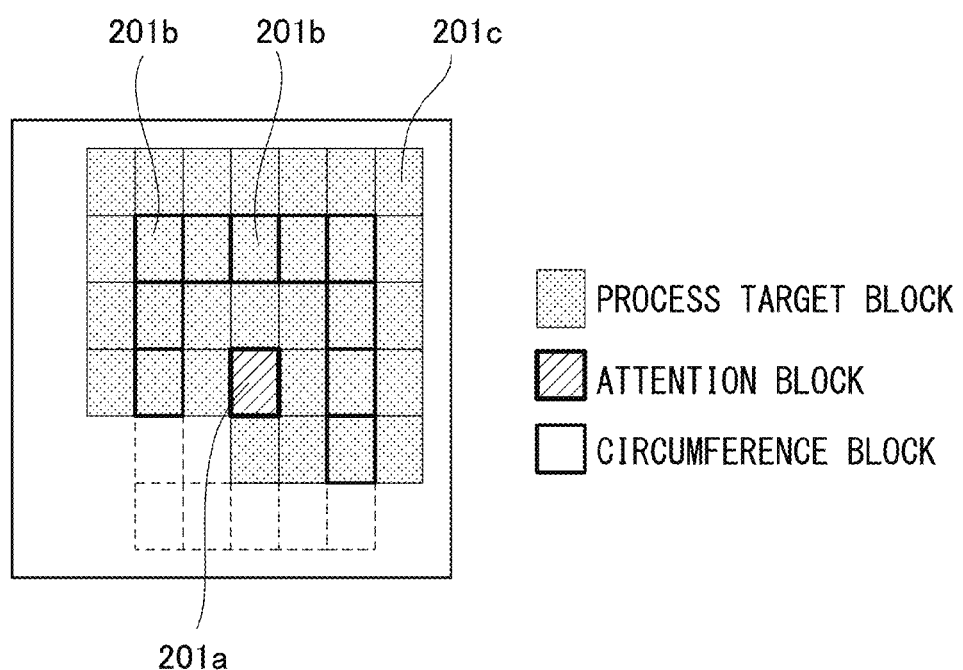

In the first embodiment, when selecting the attention block and the circumference blocks (Step S52), all of the blocks located in the outer circumference of the blocks adjacent to the attention blocks are selected as the circumference blocks for process targets. However, in the second embodiment, as illustrated in FIG. 6B, the circumference blocks 201b are selected from the process target blocks 201c. Thus, the dotted line portions are not selected as the circumference blocks 201b. These process target blocks 201c are portions which are not masked by the mask process (Step S150). Namely, the masked portions are not set as process target blocks. Owing to such a process, a dark block except dirt is prevented from being counted, while the number of process target blocks is reduced. Accordingly, the process speed can be improved. In the process which counts a weak edge (Step S55), since the weak edge of the masked portion is not counted, the process speed can be also improved.

(Process Time Determination Process)

In the process time determination process (Step S170) according to the second embodiment, the time interval for executing each process and the accumulation of information is used depending on an on road or an off road in the determination of the elapse of a predetermined time. Namely, in an off road, the attachment of the dirt easily occurs, so that the presence or absence of the dirt can be detected by the information accumulated for a short period of time. On the other hand, in an on road, the attachment of the dirt hardly occurs compared to an off road, so that a long time interval is set, and the determination is executed by accumulating the information for a long period of time. In this embodiment, the time interval for accumulating the information is set depending on an on road or an off road because the presence or absence of the dirt is detected. However, the present invention is not limited thereto. In a case of detecting waterdrops, for example, the time interval can be adjusted depending on weather. The time interval for detecting the presence or absence of the dirt can be adjusted depending on not only a road condition but also weather.

(Brightness Change Extraction Process)

The brightness change extraction process (Step S180) is executed by the brightness change extractor 38. In the brightness change extraction process in the second embodiment, the process similar to that in the first embodiment is executed. Thus, the detailed description thereof will be omitted. This process is not executed for the masked block, so that the process speed can be improved.

After the accumulated information is sufficiently obtained, the attached matter determination process is executed by the attached matter determiner 32 (Step S190). The attached matter determination process in the second embodiment is similar to the process in the first embodiment except that the masked block is not counted. Thus, the description for the similar processes is omitted, and the process different from that in the first embodiment will be described below.

In the calculation of the score of the dirt determination target with respect to each block (Step S81), the block masked by the above-described each mask process is not set as a count target for each process. Namely, as described above, the process block which overlaps with the light source area, the process block which overlaps with the track, the process block which overlaps with the own vehicle shadow and the process block which overlaps with the own vehicle body are set aside for counting a dirt determination target.

(Output Information Generation Process)

The output information generation process (Step S200) is executed by the output information generator 34. In the output information generation process in the second embodiment, the process similar to that in the first embodiment is executed. Thus, the detailed description thereof will be omitted.

As described above, in the second embodiment, even when a road surface condition (for example, lane marker, track, own vehicle shadow) or illumination environment (for example, light source such as sun light or vehicle light), which is likely to be false-recognized as dirt, occurs, the mask process which eliminates an imaging target except lens-attached matter from the attention block is executed, so that the presence or absence of the attachment of the dirt can be detected with a high accuracy. By eliminating the mask area from the dirt determination process target, the whole lens-attached matter detection process can be effectively executed at a high speed.

In the first and second embodiments, an example which detects dirt is described. However, the present invention is not limited to the detection of the dirt. The present invention can be used for a detector or a detection process for another lens-attached matter such as waterdrops, dust, paint or bird dropping. For example, when waterdrops such as rain or fog attach to a lens, a problem, for example, a strain image or miss-focusing occurs, so that the operation of the image-sensing application such as vehicle detection or lane detection may be affected. For this reason, it becomes necessary to draw driver's attention by detecting the attachment of the waterdrops to blow out the attachment by air, for example.

In each embodiment, since the dirt is detected, the presence of the attachment of the dirt is determined when the average brightness value of the attention block is lower than that of the circumference block in the brightness distribution extraction process and the change in the average brightness value is small in the brightness change extraction process. More specifically, the brightness is decreased because the dirt has a low light permeability and is brackish. On the other hand, the waterdrops have a high light permeability and brightness which is substantially similar to that in the circumference, but the brightness of the waterdrops is likely to be changed over time. Moreover, the weak edge is extracted in the outer circumference of the waterdrops when the waterdrops attach to a lens. However, the degree of the edge intensity may differ from that of the dirt. Therefore, the attachment of the waterdrops can be determined when the average brightness value of the attention block is equal to that of the circumference block or a change in the average brightness value is large in the brightness change extraction process in a case that the weak edge is detected.

Consequently, in the detection of the attachment of waterdrops, it is preferable to use a threshold suitable for the waterdrops when extracting the weak edge by the edge extraction process in the first and second embodiments. When comparing the average brightness value of the attention block with that of the circumference block by the brightness change extraction process, the determination is based on whether or not the brightness is the same or whether or not the change in the brightness by the brightness change extraction process is large. As described above, it is preferable to configure the lens-attached matter detection process with the logic which executes a process according to a type of attached matter. Moreover, it is preferable to configure the vehicle system which executes the most suitable process according to a type of attached matter.

According to the above-described lens-attached matter detector, only lens-attached matter such as dirt, dust, or waterdrops, which is attached to a lens of a camera, for example, can be detected with a high accuracy. Therefore, for example, a stain on a lens can be smoothly informed to a driver or an automatic cleaning system, so that lens-attached matter can be smoothly eliminated. Moreover, the imaging sensing application such as vehicle detection using a camera can be preferably performed. Furthermore, only lens-attached matter can be detected with a high accuracy without detecting attached matter except lens-attached matter because the lens-attached matter is detected based on the comparison between the brightness value of the attention area and the brightness value of the circumference area. Consequently, the process efficiency can be improved without unnecessarily informing dirt to a driver or unnecessarily performing automatic cleaning.

As described above, the lens-attached matter detector may include the mask processor which eliminates from the attention area an area except lens-attached matter in the area whose edge intensity is within a threshold range extracted by the edge extractor. With this configuration, when a road surface condition (for example, lane marker, track, or own vehicle shadow) or an illumination environment (light source such as sun light or vehicle light), which is likely to be false-detected as dirt, in which a time series variation in a brightness value is small, and the brightness value of the attention area is smaller than the brightness value of the circumference area in the area whose edge intensity is within the threshold range occurs, an imaging object except lens-attached matter can be eliminated from the attention area. Therefore, the determination of the presence or absence of the lens-attached matter by the lens-attached matter determiner can be executed with a high accuracy.

Moreover, according to the embodiments of the present invention, the lens-attached matter detector and the lens-attached matter detection method capable of detecting only lens-attached matter such as dirt, dust, or waterdrops which is attached to a lens of a camera, for example, and the vehicle system including such a lens-attached matter detector can be provided.

Although the embodiments of the present invention have been described above, the present invention is not limited thereto. It should be appreciated that variations may be made in the embodiments described by persons skilled in the art without departing from the scope of the present invention.

What is claimed is:

1. A lens-attached matter detector, comprising:
   an edge extractor that creates an edge image based on an input image from an imager having a lens, divides the edge image into a plurality of areas including a plurality of pixels, and extracts an area where edge intensity is within a threshold range as an attention area;
   a brightness distribution extractor that obtains a brightness value of the attention area and a brightness value of a circumference area;
   a brightness change extractor that obtains the brightness value of the attention area and the brightness value of the circumference area obtained by the brightness distribution extractor for a predetermined time interval, and obtains a time series variation in the brightness value of the attention area based on the brightness value of the attention area for the predetermined time interval; and an attached matter determiner that determines the presence or absence of attached matter based on the time series variation in the brightness value of the attention area.

2. The lens-attached matter detector according to claim 1, further comprising a mask processor that eliminates from the attention area the area except lens-attached matter in the area where edge intensity is within the threshold range extracted by the edge extractor.

3. The lens-attached matter detector according to claim 2, wherein the mask processor eliminates from the attention area an area including an edge extending in a direction toward a vanishing point of the input image.

4. The lens-attached matter detector according to claim 2, wherein the mask processor eliminates from the attention area an area including a track on a road surface, which is generated on the input image.

5. The lens-attached matter detector according to claim 2, wherein the mask processor eliminates from the attention area an area including a shadow of an attached object provided with the imager, which is generated on the input image.

6. The lens-attached matter detector according to claim 2, wherein the mask processor eliminates from the attention area an area including an image of a light source, which is generated on the input image.

7. The lens-attached matter detector according to claim 1, wherein when the brightness value of the attention area obtained by the brightness distribution extractor is smaller than a predetermined value by being compared with the circumferential area, and the time series variation in the brightness value obtained by the brightness change extractor is smaller than a predetermined value, the attached matter determiner determines that attached matter having a low permeability is attached to the attention area.

8. The lens-attached matter detector according to claim 1, wherein when the brightness value of the attention area obtained by the brightness distribution extractor is larger than a predetermined value by being compared with the circumferential area, and the time series variation in the brightness value obtained by the brightness change extractor is larger than a predetermined value, the attached matter determiner determines that attached matter having a high permeability is attached to the attention area.

9. A lens-attached matter detection method which is executed by the lens-attached matter detector according to claim 1, comprising an edge extraction process that creates an edge image based on an input image, divides the edge image into a plurality of areas including a plurality of pixels, and extracts an area where edge intensity is within a threshold range as an attention area;

a brightness value distribution extraction process that obtains a brightness value of the attention area and a brightness value of a circumference area of the attention area;

a brightness value extraction process that obtains the brightness value of the attention area and the brightness value of the circumference area obtained by the brightness value distribution extraction process for a predetermined time interval, and that obtains a time series variation in the brightness value of the attention area based on the brightness value of the attention area for the predetermined time interval; and an attached matter determination process that determines the presence or absence of attached matter based on the time series variation in the brightness value of the attention area.

10. The lens-attached matter detection method according to claim 9, further comprising a vehicle information-obtaining process that obtains vehicle information including at least vehicle speed information, wherein all of the processes are completed when the vehicle information-obtaining process determines that a vehicle speed is a threshold or below based on the vehicle speed information.

11. The lens-attached matter detection method according to claim 9, wherein all of the processes are completed when a gain adjustment value of the input image is a threshold or more.

12. A vehicle system, comprising
a lens- attached matter detector according to claim 1;
an imager provided in a vehicle, having a lens, and that images a circumference of the vehicle; and
at least one application that operates based on detection information of the lens-attached matter detected by the lens-attached matter detector relative to the input image shot by the imager.

13. The vehicle system according to claim 12, wherein the lens-attached matter detector detects the lens-attached matter relative to only an area for use in the application in the input image shot by the lens.

* * * * *